United States Patent
Liu et al.

(10) Patent No.: US 9,391,322 B2
(45) Date of Patent: Jul. 12, 2016

(54) CATHODE MATERIAL AND BATTERY

(71) Applicant: E I DU PONT DE NEMOURS AND COMPANY, Wilmington, DE (US)

(72) Inventors: Jun J Liu, Wilmington, DE (US); Mark Gerrit Roelofs, Earleville, MD (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 106 days.

(21) Appl. No.: 13/837,378

(22) Filed: Mar. 15, 2013

(65) Prior Publication Data

US 2014/0272555 A1 Sep. 18, 2014

(51) Int. Cl.
*H01M 4/88* (2006.01)
*H01M 4/485* (2010.01)
*H01M 4/36* (2006.01)
*H01M 4/505* (2010.01)
*H01M 10/0525* (2010.01)
*H01M 10/0569* (2010.01)

(52) U.S. Cl.
CPC .............. *H01M 4/485* (2013.01); *H01M 4/364* (2013.01); *H01M 4/505* (2013.01); *H01M 10/0525* (2013.01); *H01M 10/0569* (2013.01); *Y02E 60/122* (2013.01)

(58) Field of Classification Search
CPC ..... H01M 4/505; H01M 4/364; H01M 4/131; H01M 1/485; C01G 45/1257; C01G 45/1221; C01G 45/12
USPC ............ 252/128.1, 182.1; 429/223, 224, 200, 429/221
See application file for complete search history.

(56) References Cited

U.S. PATENT DOCUMENTS

| | | |
|---|---|---|
| 5,738,957 A | 4/1998 | Amine et al. |
| 7,303,840 B2 | 12/2007 | Thackeray et al. |
| 7,635,536 B2 | 12/2009 | Johnson et al. |
| 7,790,308 B2 | 9/2010 | Johnson et al. |
| 2002/0070374 A1 | 6/2002 | Barker et al. |
| 2003/0027048 A1 | 2/2003 | Lu et al. |
| 2003/0108793 A1 | 6/2003 | Dahn et al. |
| 2006/0051671 A1* | 3/2006 | Thackeray et al. ........... 429/224 |
| 2010/0248033 A1* | 9/2010 | Kumar et al. ................. 429/223 |

FOREIGN PATENT DOCUMENTS

| | | |
|---|---|---|
| JP | 31005325 | 7/1956 |
| JP | 10-172571 A | 12/1996 |
| WO | 0009477 | 2/2000 |
| WO | 2013035595 A1 | 3/2013 |

OTHER PUBLICATIONS

International Search Report for PCT/US2014027976, Issued on Jun. 26, 2014, by the US Patent and Trademark Office.
Liu and Manthiram, "Understanding the Improvement in the Electrochemical Properties of Surface Modified 5 V LiMn1,42Ni0.42Co01604 Spinel Cathodes in Lithium-ion Cells", Chemical Materials vol. 21, pp. 1695-1707 (2009).

(Continued)

*Primary Examiner* — Khanh Tuan Nguyen

(57) ABSTRACT

A lithium ion battery cathode material, and an electrode prepared from such material, is described. The cathode material has a layered-spinel composite structure. The lithium ion battery operates at a high voltage (i.e. up to about 5 V) and has a desirably high cycling performance and rate capability.

17 Claims, 16 Drawing Sheets

(56) References Cited

OTHER PUBLICATIONS

Kim, J. H. et al., "Molten salt synthesis of LiNi0.5Mn1.5O4 spinel for 5 V class cathode material of Li-ion secondary battery", Electrochimica Acta 49 (204) 219-227.

Liu and Manthiram, "Understanding the Improved Electrochemical Performances of Fe-Substituted 5 V Spinel Cathode LiMn1.5Ni0.5O4", J. Phys. Chem. C. 2009, 113, 15073-15079.

Tsuchida, Takashi; et al., "Direct Synthesis of n-Butanol from Ehanol over Nonstoichiometric Hydroxapatite", Industrial Engineering Chem Research 2006, 45, pp. 8634-8642.

Jun Lieu and Manthiram, Understanding the Improvement in the Electrochemical Properties of Surface Modified 5 V LiMn1.42Ni0,16O4 Spinel Cathodes in Lithium-ion Cells, Chem Materials, 2009, 21, pp. 1695-1701.

\* cited by examiner

CATHODE MATERIAL AND BATTERY

TECHNICAL FIELD

The invention relates to the field of lithium ion batteries. More specifically, the invention relates to a lithium ion battery comprising lithium-based composite cathodes.

BACKGROUND

With the advancement in portable electronic devices and intense interest in plug-in hybrid electric vehicles, there is great demand to increase the energy and power capabilities of lithium ion batteries. In this regard, the 5 V spinel cathode $LiMn_{2-x}M_xO_4$ (where M is e.g. Co, Cr, Ni, Fe, Cu or Ga, and x is about 0.5) has drawn much attention due to its high operating voltage and the high intrinsic rate capability offered by the 3-dimensional lithium ion diffusion in the spinel lattice. Moreover, the difficulties encountered with the dissolution of manganese and Jahn-Teller distortion in the 4 V $LiMn_2O_4$ cathode are suppressed in $LiMn_{2-x}M_xO_4$ as it contains less $Mn^{3+}$ in the material. In this regard, a 5 V spinel cathode such as $LiMn_{1.5}Ni_{0.5}O_4$ is very attractive due to a nearly flat operating voltage close to 5 V and an acceptably high capacity arising from operation of the $Ni^{2+/3+}$ and $Ni^{3+/4+}$ redox couples.

Even a $LiMn_{2-x}M_xO_4$ cathode active material suffers from stability problems, however, including the structural instability problems sometimes seen in cation ordered $LiMn_{1.5}Ni_{0.5}O_4$ material, and the surface instability problems sometimes caused by the reaction with electrolyte. Problems such as these can significantly degrade the electrochemical performance.

Partial substitution of Mn and/or Ni in $LiMn_{1.5}Ni_{0.5}O_4$ by other elements such as Li, Al, Mg, Ti, Cr, Fe, Co, Cu, Zn or Mo has been pursued to improve the cyclability. Some of these substitutions improve the cyclability due to the stabilization of the spinel lattice with a disordering of the cations in the 16d octahedral sites, and a smaller lattice parameter difference among the three cubic phases formed during cycling. Although the structural stability of $LiMn_{1.5}Ni_{0.5}O_4$ can be improved by proper cation partial substitution, chemical instability still remains as a problem.

A need thus remains for improved performance in a balance of several different properties as exhibited by the $LiMn_{1.5}M_{0.5}O_4$ spinel cathode material.

SUMMARY

The subject matter of this disclosure meets the above described needs by offering various advantageous technical effects, included among which are:

providing an electrode material, such as a cathode active material, that displays a good balance of desirably high charge/discharge and cycling performance, and desirably high rate capability; and providing an electrode material, such as a cathode active material based on a $LiMn_{1.5}M_{0.5}O_4$ spinel material, in which stability problems therein are addressed by admixing a spinel material with other lithium-containing materials to form a composite cathode material.

Accordingly, one embodiment of the subject matter of this disclosure provides a composite material represented by the structure of the following Formula IV:

$$x(Li_{2-w}A_{1-v}Q_{w+v}O_{3-e}) \cdot (1-x)(Li_yMn_{2-z}M_zO_{4-d}) \qquad \text{IV}$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In another embodiment of the subject matter hereof, the composition is fabricated into a cathode for an electrochemical cell, and the cathode is charged to a voltage of about 4.7 to about 4.95 V vs. $Li/Li^+$, the composition experiences delithiation such that the component of the composite material represented as $(Li_{2-w}A_{1-v}Q_{w+v}O_{3-e})$ is thereby represented as $(Li_{2-w-g}A_{1-v}Q_{w+v}O_{3-e-g/2})$, where g is less than about 0.3.

In a further embodiment of the subject matter of this disclosure, there is provided a lithium ion battery comprising
(a) a housing;
(b) an anode and a cathode disposed in the housing and in ionically conductive contact with one another, wherein the cathode comprises the composite material of Formula IV;
(c) a nonaqueous electrolyte composition disposed in the housing and providing an ionically conductive pathway between the anode and the cathode; and
(d) a porous separator between the anode and the cathode.

In yet another embodiment of the subject matter hereof, there is provided a method for preparing a cathode active composition of the formula $$x(Li_{2-w}A_{1-v}Q_{w+v}O_{3-e}) \cdot (1-x)(Li_yMn_{2-z}M_zO_{4-d}) \qquad \text{(Formula IV)},$$

wherein the method comprises the steps of:
(a) combining
  (i) the salts and/or oxides of the metals Li, Mn, A and Q with
  (ii) a flux agent having a melting temperature in the range of from about 600° C. to about 1000° C.,
to form a mixture of same;
(b) heating the mixture of step (a) to a temperature of at least the melting temperature of the flux agent, to obtain a molten flux composition comprising the salts and/or oxides of the metals Li, Mn, A and Q; and
(c) cooling the molten flux composition of step (b) at a cooling rate of less than or equal to about 1° C./minute for at least until such time that said molten flux composition solidifies to form a solid composition,
wherein:
(1) x is between 0 and 1;
(2) A comprises one or both members of the group consisting of Mn and Ti;
(3) Q comprises one or more members of the group consisting of Al, Ca, Co, Cr, Cu, Fe, Ga, Mg, Nb, Ni, Ti, V, Zn, Zr and Y;
(4) e is 0 to about 0.3;
(5) v is 0 to about 0.5.
(6) w is 0 to about 0.6;
(7) M comprises one or more members of the group consisting of Al, Ca, Co, Cr, Cu, Fe, Ga, Li, Mg, Mn, Nb, Ni, Si, Ti, V, Zn, Zr and Y;
(8) d is 0 to about 0.5;
(9) y is 0 to about 1; and
(10) z is about 0.3 to about 1; and wherein the $Li_yMn_{2-z}M_zO_{4-d}$ component has a spinel structure and the $Li_{2-w}Q_{w+v}A_{1-v}O_{3-e}$ component has a layered structure.

In still another embodiment, the present invention is a composition made by a method comprising the steps of:
(a) combining
  (i) the salts and/or oxides of the metals Li, Mn, A and Q with
  (ii) a flux agent having a melting temperature in the range of from about 600° C. to about 1000° C.,
to form a mixture of same;
(b) heating the mixture of step (a) to a temperature of at least the melting temperature of the flux agent, to obtain a molten flux composition comprising the salts and/or oxides of the metals Li, Mn, A and Q; and
(c) cooling the molten flux composition of step (b) at a cooling rate of less than or equal to about 1° C./minute for at least until such time that said molten flux composition solidifies to form a solid composition,
wherein the composition is given by the Formula (IV) and wherein:
wherein:
  (1) x is between 0 and 1;
  (2) A comprises one or both members of the group consisting of Mn and Ti;
  (3) Q comprises one or more members of the group consisting of Al, Ca, Co, Cr, Cu, Fe, Ga, Mg, Nb, Ni, Ti, V, Zn, Zr and Y;
  (4) e is 0 to about 0.3;
  (5) v is 0 to about 0.5.
  (6) w is 0 to about 0.6;
  (7) M comprises one or more members of the group consisting of Al, Ca, Co, Cr, Cu, Fe, Ga, Li, Mg, Mn, Nb, Ni, Si, Ti, V, Zn, Zr and Y;
  (8) d is 0 to about 0.5;
  (9) y is 0 to about 1; and
  (10) z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure, and wherein the composition is characterized in that when the composition is fabricated into a cathode for an electrochemical cell, and the cathode is charged to a voltage of about 4.7 to about 4.95 V vs. $Li/Li^+$, the composition experiences delithiation such that the component of the composite material represented as $(Li_{2-w}A_{1-v}Q_{w+v}O_{3-e})$ is thereby represented as $(Li_{2-w-g}A_{1-v}Q_{w+v}O_{3-e-g/2})$, where g is less than about 0.3.

BRIEF DESCRIPTION OF THE DRAWINGS

Note—(.) in the figures indicates the $Li_2MnO_3$ phase.

DETAILED DESCRIPTION

Figure 1:
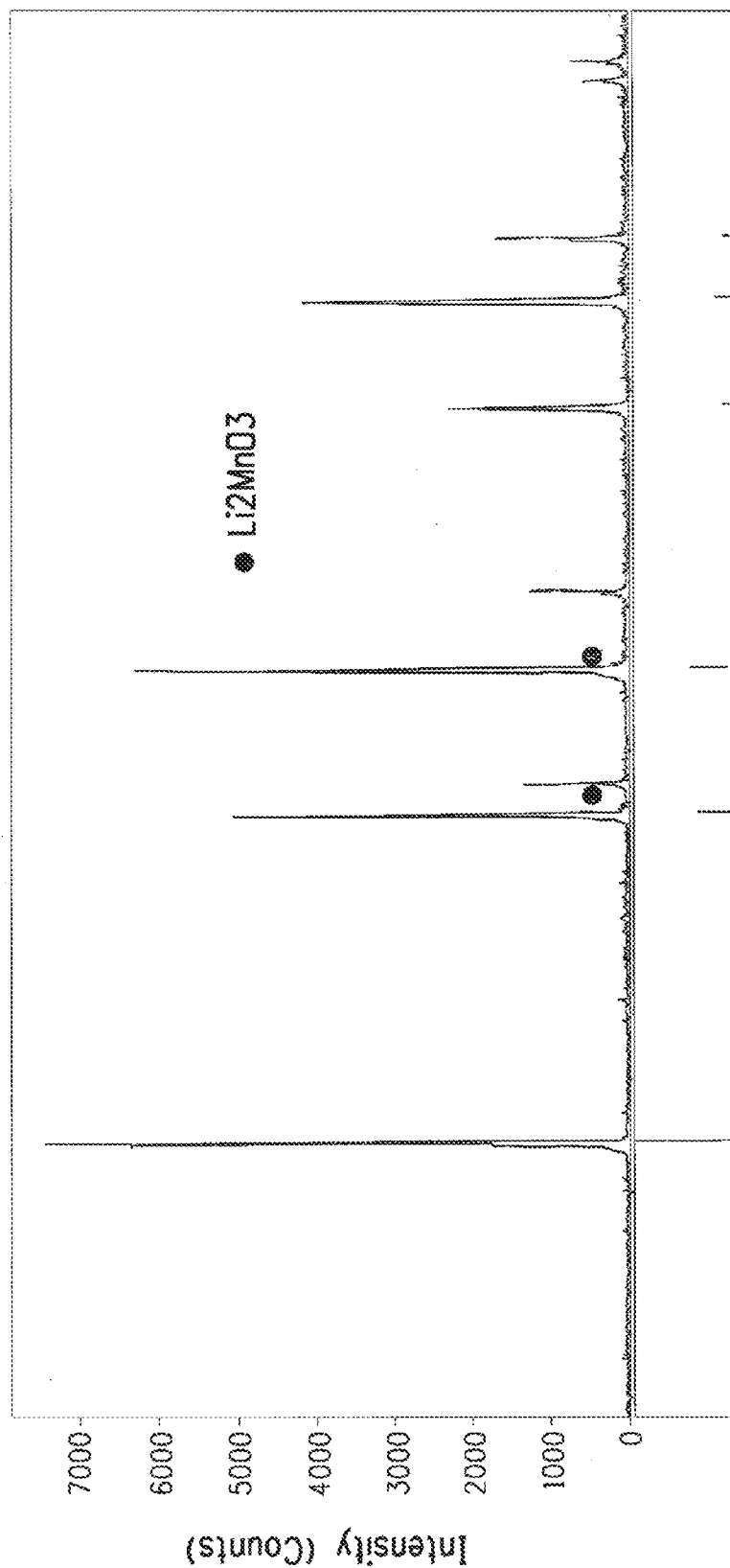
FIG. 1 is an x-ray diffraction pattern of the $0.03Li_2MnO_3\cdot0.97LiMn_{1.5}Ni_{0.5}O_4$ composite material.

As used above and throughout the description of the subject matter hereof, the following terms, unless otherwise indicated, shall be defined as follows:

"Anode" refers to the electrode of an electrochemical cell, at which oxidation occurs during discharge. In a galvanic cell, such as a battery, the anode is the negative electrode.

"Cathode" refers to the electrode of an electrochemical cell, at which reduction occurs during discharge. In a galvanic cell, such as a battery, the cathode is the positive electrode.

"Electrolyte salt" refers to an ionic salt that is at least partially soluble in the solvent of a nonaqueous electrolyte composition, and that at least partially dissociates into ions in the solvent of a nonaqueous electrolyte composition to form a conductive electrolyte composition.

"Lithium ion battery" refers to a type of rechargeable electrochemical cell in which lithium ions move from the cathode to the anode during charge, and from the anode to the cathode during discharge. The battery can be a collection of one or more cells arranged to provide electrical energy. The cells of a battery can be arranged in various configurations (e.g. series, parallel and combinations thereof).

"Nonaqueous electrolyte" composition refers to a chemical composition suitable for use as an electrolyte in a lithium ion battery. The electrolyte composition typically comprises at least one nonaqueous solvent and at least one electrolyte salt.

Disclosed herein is a composite material that contains a mixture of different lithium compounds. The composite material can be formed, for example, as a composition of matter, and one of the components (Component I) of the mixture from which such composite material is made can be represented by the structure of the following Formula I:

$$(Li_{2-w}A_{1-v}Q_{w+v}O_{3-e}) \quad \text{I}$$

wherein:

A is Mn or Ti, or a combination of Mn and Ti;

Q comprises at least one metal selected from the group consisting of Al, Ca, Co, Cr, Cu, Fe, Ga, Mg, Nb, Ni, Ti, V, Zn, Zr or Y;

e is 0 to about 0.3;

v is 0 to about 0.5; and w is 0 to about 0.6.

Another of the components (Component II) of the mixture from which such composite material is made can be represented by the structure of the following Formula II:

$$(Li_y Mn_{2-z}M_z O_{4-d}) \quad \text{II}$$

wherein:

M is at least one metal selected from the group consisting of Al, Ca, Co, Cr, Cu, Fe, Ga, Li, Mg, Mn, Nb, Ni, Si, Ti, V, Zn, Zr or Y;

d is 0 to about 0.5;

y is 0 to about 1; and z is about 0.3 to about 1.

As a result, there is provided, in one of the embodiments of the present invention, a composite material that can be prepared by the combining or mixing of the components described above, wherein the composite material can be represented by the structure of the following Formula III:

$$(Li_{2-w}A_{1-v}Q_{w+v}O_{3-e}) \cdot (Li_y Mn_{2-z}M_z O_{4-d}) \quad \text{III}$$

wherein the components of the composite composition of Formula III are defined as above for each of Formula I and Formula II.

In various other embodiments of the subject matter hereof, there is provided a composite material that can be prepared by the combining or mixing of the components described above (Components I and II) in relative amounts such that the composite material can be represented by the structure of the following Formula IV:

$$x(Li_{2-w}A_{1-v}Q_{w+v}O_{3-e}) \cdot (1-x)(Li_y Mn_{2-z}M_{2-z}O_{4-d}) \quad \text{IV}$$

wherein x is 0 to about 1; and A, Q, e, v, w, M, d, y and z are as set forth above. In yet other embodiments, x can be about 0.005 or more, about 0.01 or more, about 0.015 or more, about 0.02 or more, or about 0.03 or more, and yet can be about 0.1 or less, about 0.09 or less, about 0.08 or less, about 0.07 or less, about 0.06 or less, or about 0.05 or less. In yet other embodiments, x can be in the range of about 0.005 to about 0.08, or in the range of about 0.01 to about 0.07, or in the range of about 0.015 to about 0.06, or in the range of about 0.02 to about 0.05.

In various preferred embodiments of the subject matter hereof, preparing a composite material wherein the Components I and II are contained in relative amounts such as described above is desirable for the purpose of providing a composite material that displays a good balance of desirably high charge/discharge and cycling performance, and desirably high rate capability.

In yet another embodiment of the subject matter hereof, in any of the composite materials described herein by Formulae III or IV, or in any of the components thereof described in Formulae I and II, the $(Li_{2-w}A_{1-v}Q_{w+v}O_{3-e})$ component can have a layered structure, and the $(Li_y Mn_{2-z}M_z O_{4-d})$ component can have a spinel structure.

When the $Li_{2-w}Q_{w+v}A_{1-v}O_{3-e}$ component has a layered structure, some of lithium ions occupy 16c octahedral sites, and the rest of the lithium ions occupy 16d octahedral (transitional metal cation) sites. A and Q cations also occupy 16d octahedral sites. However, some of the Q cations can replace Li and A in the structure. Cations at 16d octahedral sites and cations, which are predominately lithium, at 16c octahedral sites occupy alternate planes, and give the material a layered structure. The layered structure provides a two dimensional framework for lithium ion diffusion. In various embodiments, both A and Q occupy octahedral sites. One typical example of a layered material as provided by the $Li_{2-w}Q_{w+v}A_{1-v}O_{3-e}$ component is $Li_2MnO_3$.

When the $Li_y Mn_{2-z}M_z O_{4-d}$ component has a spinel structure, lithium ions can occupy 8a tetrahedral sites when $0<y\le 1$, and can occupy 16c octahedral sites when $1<y\le 2$. Mn and M cations occupy 16d octahedral sites of the cubic close-packed oxygen array. The interconnected interstitial sites of the cubic close-packed oxygen array provide a three dimensional framework for lithium ion diffusion. Typical examples of spinel materials as provided by the $Li_y Mn_{2-z}M_z O_{4-d}$ component are $LiMn_{1.5}Ni_{0.5}O_4$ and $LiMn_{1.5}Ni_{0.45}Fe_{0.05}O_4$.

In other embodiments, the $Li_y Mn_{2-z}M_z O_{4-d}$ component of a composite hereof can be cation disordered, or have a cation disordered structure. In a "cation-disordered" structure, Mn and M are randomly located at the 16d sites of the Fd3 (bar)m structure. The cation disordered structure has low lattice strain during lithium insertion and extraction.

As a result of the spatial arrangements applicable to the various components of the composite material hereof (as described above), there is further provided in other embodiments a composite material represented by the structure of the following Formula III:

$$(Li_{2-w}A_{1-v}Q_{w+v}O_{3-e}) \cdot (Li_y Mn_{2-z}M_z O_{4-d}) \quad \text{III}$$

wherein A, Q, e, v, w, M, d, y and z are as set forth above, and wherein Component I, the $(Li_{2-w}A_{1-v}Q_{w+v}O_{3-e})$ component, has a layered structure, and Component II, the $(Li_y Mn_{2-z}M_z O_{4-d})$ component, has a spinel structure. Still further, in the above embodiment in which Component I has a layered structure, and Component II has a spinel structure, the content of the components of the composite material can be represented by the structure of the following Formula IV:

$$x(Li_{2-w}A_{1-v}Q_{w+v}O_{3-e}) \cdot (1-x)(Li_y Mn_{2-z}M_z O_{4-d}) \quad \text{IV}$$

wherein x, A, Q, e, v, w, M, d, y and z are as set forth above.

In various specific embodiments of the subject matter hereof, in any of the composite materials described herein by Formulae III or IV, or in any of the components thereof described in Formulae I and II, A is Mn, A is Ti, or A is both Mn and Ti; and/or Q is one or more of Al, Co, Cr, Cu, Fe, Ga, Mg, Ni, Ti, V or Zn; and/or Q is one or more of Co, Cr, Cu, Fe, Ga, Ni or V; and/or Q is one or more of Co, Cu, Fe, Ga or Ni; and/or Q is one or both members of Fe or Ni; and/or e is 0; or e is 0 or more, about 0.01 or more, about 0.05 or more, or about 0.1 or more, and yet is about 0.3 or less, about 0.25 or less, about 0.2 or less; about 0.15 or less, or is about 0.10 or less, and/or v is 0; or v is 0 or more, about 0.01 or more, about 0.05 or more, about 0.1 or more, or about 0.2 or more, and yet is about 0.5 or less, about 0.4 or less, about 0.3 or less, or about 0.2 or less, or about 0.1 or less; and/or w is 0; or w is 0 or more, about 0.01 or more, about 0.05 or more, about 0.1 or more, or about 0.2 or more, and yet is about 0.6 or less, about 0.5 or less, about 0.4 or less; about 0.3 or less, or about 0.2 or less, or about 0.1 or less; and/or M is one or more of Al, Co, Cr, Cu, Fe, Ga, Mg, Ni, Ti, V or Zn; and/or M is one or more of Co, Cr, Cu, Fe, Ga, Ni or V; and/or M is one or more of Co, Fe, Ga or Ni; and/or M is one or more members of Fe or Ni; and/or d is 0; or d is 0 or more, or is about 0.01 or more, or is about 0.05 or more, or is about 0.1 or more, or is about 0.2 or more, and yet is about 0.5 or less, or is about 0.4 or less, or is about 0.3 or less, or is about 0.2 or less; and/or y is 0; or y is 0 or more, or is about 0.01 or more, or is about 0.05 or more, or is about 0.1 or more, or is about 0.3 or more, and yet is about 1 or less, or is about 0.9 or less, or is about 0.8 or less; and/or z is about 0.3 or more, about 0.4 or more, or 0.5 or more, and yet is about 1 or less, about 0.9 or less, or about 0.8 or less.

A composite material as disclosed herein can be prepared using various conventional methods. Liu and Manthiram, *Chem. Mater.* 2009, 21, 1695~1707, discloses a co-precipitation method that involves the precipitation of the hydroxide precursors of the acetates of the constituent metals of the composite, for example manganese, nickel, iron, gallium, cobalt and/or copper, by the addition of KOH, followed by the firing the oven-dried hydroxide precursors with LiOH.H20 at 900° C. in air for 12 hours with a heating/cooling rate of 1° C./min. U.S. Pat. No. 5,738,957 (Amine) discloses a solid state method that involves firing a mixture of oxide, hydroxide, carbonate and nitrate precursors of the constituent metals of the composite in an atmosphere or air or oxygen at a temperature of above 450° C., preferably 600° C. to about 1000° C.; and also discloses a sol-gel method that involves the mixture in ethyl alcohol or water of acetates, nitrates, sulfates, organic acid salts (such as formic acid salts, oxalic acid salts or citric acid salts) and/or inorganic acid salts of the constituent metals of the composite. Carbon black can be used as the gel stabilizing agent. Ammonia water is added, and the precipitate(s) are dried in a rotary evaporator under vacuum, and can then be fired at 400° C. in air as needed. In the composite material hereof, the two components are structurally integrated and/or are physically mixed and blended by their method of preparation, to form the composite.

Another suitable method for obtaining the composition of the present invention is referred to herein as the flux method. This method comprises the steps of (a) combining a lithium compound (compound I) with a manganese compound (compound II), one or more compounds of the metal M (compound IIA), and a third compound (compound III), wherein (compound III) comprises one or more flux agents; wherein the ratio of the sum of the moles of lithium from (I) and the moles of manganese from (II) to the moles of (III) is in the range of about 1:100 to about 100:1, to form a reaction mixture; (b) heating the reaction mixture to a temperature in the range of from about 600 to about 1000° C. at a rate of about 2° C. per minute; and (c) cooling the reaction mixture at a cooling rate of less than about 1° C. per minute, until a solid composition is obtained. The flux agent comprises, but is not limited to, halides, sulfates, nitrates, tungstates, vanadic-acid salts, molybdates, and niobates, or compounds that can generate halide, sulfate, nitrate, tungstate, vanadic-acid salt, molybdate, or niobate compounds during the heating process.

In some embodiments the reaction mixture can be heated to a maximum temperature above 700° C., or above 750° C., or above 800° C., or above 850° C.

In one embodiment, compound (I) is a lithium salt of organic or inorganic acid or oxyacid, or mixture thereof. In another embodiment compound (I) is a lithium halide, acetate, carbonate, oxyhalide, amide, hydroxide, azide, borate, carbide, or hydride, or mixture thereof, or $Li_2CO_3$, $LiNO_3$, or LiOH, or mixture thereof.

In one embodiment the manganese compound (II) is a manganese salt of organic and inorganic acid and oxyacid, or oxide, or mixtures thereof. In another embodiment the manganese compound (II) is manganese oxide, carbonate, halide, hydroxide, sulfate, acetate, nitrate, sulfide or phosphate, or mixture thereof, or $MnO_2$, $MnCO_3$, or $Mn_2O_3$, or mixture thereof.

Compound IIA can be a compound comprising at least one metal selected from the group consisting of: Al, Ca, Co, Cr, Cu, Fe, Ga, Li, Mg, Mn, Nb, Ni, Si, Ti, V, Zn, Zr or Y, or combinations thereof. Alternatively, the metal(s) useful for compound IIA can be selected from one or more of Ni, Cr, Co, Fe, Ga or Cu.

Compound (III) can be referred to herein as a flux agent, which includes any compound that can generate an flux agent (flux agent precursor) when operating within the temperature parameters of the method described herein. The flux agent can be an alkali metal halide, sulfate, nitrate, tungstate, vanadic-acid salt, molybdate, and niobate, or a compound that can generate a alkali metal halide, sulfate, nitrate, tungstate, vanadic-acid salt, molybdate, and niobate during the heating process.

In one embodiment compound (III) can be an alkali metal halide or sulfate, or mixtures thereof. In another embodiment compound (III) can be a lithium halide or sulfate, or mixtures thereof, or LiCl.

The composite materials disclosed herein are suitable for use as electro-active materials, such as anode-active materials or cathode-active materials, in an electrochemical cell. As a result, there is further disclosed herein an electrode for an electrochemical cell wherein the electrode is prepared from a composite material hereof. In a preferred embodiment, the composite material hereof is used to prepare a cathode in an electrochemical cell.

There is consequently provided herein, in one embodiment of an electrode for use in an electrochemical cell, an electrode (such as the cathode) that includes a composite material represented by the structure of the following Formula III:

$$(Li_{2-w}A_{1-v}Q_{w+v}O_{3-e})\cdot(Li_yMn_{2-z}M_zO_{4-d}) \qquad III$$

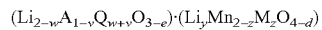

wherein A, Q, e, v, w, M, d, y and z are as set forth above. In yet other embodiments of an electrode prepared from a composite material as described above, as can be contained in an electrochemical cell, the composite material may be further represented by the structure of the following Formula IV:

$$x(Li_{2-w}A_{1-v}Q_{w+v}O_{3-e})\cdot(1-x)(Li_yMn_{2-z}M_zO_{4-d}) \qquad IV$$

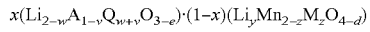

wherein x, A, Q, e, v, w, M, d, y and z are as set forth herein above.

Electrodes made from composite materials as described herein can be electrochemically activated in lithium cells. The electrochemical reaction to charge the cell is believed to occur primarily by the extraction of lithium ions with a concomitant oxidation of $Ni^{2+}$ to $Ni^{4+}$ in a spinel component of the composite, but may also result from the extraction of lithium with a concomitant loss of oxygen from a layered component thereof. When there is a removal of lithium and oxygen from the composite material from which an electrode is made, the composite material may be said in such case to have been delithiated.

One method of characterizing an electrode formed from a composite material hereof, such as a Formula III or Formula IV material, can therefore be expressed in terms of the extent of delithiation experienced by the electrode composite material, if any at all, when a cell containing such electrode is subjected to charging. For example, such delithiation can be characterized under the following conditions: the electrode, when present as the cathode in an electrochemical cell having a lithium metal anode that is charged to a voltage of about 4.7 to about 4.95 V, or about 4.8 V, vs. Li/Li$^+$, will experience delithiation such that the component of the composite material represented as $(Li_{2-w}A_{1-v}Q_{w+v}O_{3-e})$ is thereby represented as $(Li_{2-w-g}A_{1-v}Q_{w+v}O_{3-e-g/2})$, where g is less than about 0.2, or about 0.3. In various particular embodiments, the cell can be charged from a lesser charged condition (at a rate, for example, of 10 mA/g of composite material) to a voltage of about 4.7 to about 4.95 V, or about 4.8 V vs. Li/Li$^+$, and/or the electrode can experience delithiation as a result of charging.

In other alternative embodiments, g is 0; or g is 0 or more, about 0.0001 or more, about 0.001 or more, about 0.01 or more, or about 0.05 or more, and yet is about 0.2 or less, about 0.15 or less, or about 0.1 or less. When g is 0, the component of the composite material represented as $(Li_{2-w}A_{1-v}Q_{w+v}O_{3-e})$ has not been delithiated.

Another method of characterizing an electrode formed from a composite material hereof, such as Formula IV material, can be expressed in terms of the relative extent of the electrochemical activity of the two components from which a composite material hereof is made. In various different embodiments of an electrode hereof, the component of the composite material represented as $(Li_{2-w}A_{1-v}Q_{w+v}O_{3-e})$ has little to no electrochemical activity. In various other embodiments, some of which coincide with the amount of that component in the compositional content of the composite material, the component of the composite material represented as $(Li_{2-w}A_{1-v}Q_{w+v}O_{3-e})$ has no electrochemical activity at all.

Another method of characterizing an electrode formed from a composite material hereof, such as a Formula III or Formula IV material when y is about 0.5 to about 1, can therefore be expressed in terms of the discharge capacity of an electrochemical cell containing the electrode after the cell has been subjected to charging. For example, the discharge capacity of an electrochemical cell containing the electrode can be characterized under the following conditions: the electrode, when present as the cathode in an electrochemical cell having a lithium metal anode that is
(a) charged at a voltage sufficient to remove Li$^+$ ions from the component of the composite material represented as $(Li_yMn_{2-z}M_zO_{4-d})$ to the extent that y is decreased to less than about 0.2, and
(b) then discharged at a rate of 10 mA/g of composite material to a voltage of about 3.5 V vs. a Li/Li$^+$ reference electrode,
participates in discharge of the electrochemical cell such that the contribution to the discharge capacity attributable to the component of the composite material represented as $(Li_{2-w}A_{1-v}Q_{w+v}O_{3-e})$ is less than about 250 mAh/g, or less than about 200, or less than about 100, or less than about 90 mAh/g. In various particular embodiments, the cell can be charged from a lesser charged condition (at a rate, for example, of 10 mA/g of composite material) to a charged condition.

In other alternative embodiments, the contribution to the discharge capacity of the electrochemical cell attributable to the component of the electrode represented as $(Li_{2-w}A_{1-v}Q_{w+v}O_{3-e})$ is less than about 80 mAh/g, or is less than about 60 mAh/g, or is less than about 40 mAh/g, or is less than about 20 mAh/g, or is less than about 10 mAh/g, or is less than about 5 mAh/g, or is less than about 1 mAh/g, or is less than about 0.5 mAh/g, or is 0 mAh/g.

In other alternative embodiments, the contribution to the discharge capacity of the electrochemical cell attributable to the component of the electrode represented as $(Li_{2-w}A_{1-v}Q_{w+v}O_{3-e})$ is less than about 200 mAh/g, or less than about 150 mAh/g, or less than about 100 mAh/g, or less than about 50 mAh/g, or less than about 20 mAh/g, or less than about 10 mAh/g, or less than about 5 mAh/g, or less than about 1 mAh/g, or is less than about 0.5 mAh/g, or is 0 mAh/g.

Another method of characterizing an electrode formed from a composite material hereof can also be expressed in terms of the discharge capacity of an electrochemical cell containing the electrode after the cell has been subjected to charging. For example, the discharge capacity of such a cell in the range of 4.4 to 5.2 volts is in the range of about 60 mAh/g to about 1000 mAh/g when measured at a rate of 30 mA/g or less.

In other alternative embodiments, the discharge capacity of the cell in the range of 4.4 to 5.2 volts is about 60 mAh/g or more, about 80 mAh/g or more, about 100 mAh/g or more, about 120 mAh/g or more, about 150 mAh/g or more, or is about 200 mAh/g or more, and yet is about 1000 mAh/g or less, when measured at a rate of 30 mA/g or lower.

In any of the embodiments of an electrode, as described above, that is prepared from any of the composite materials described herein by Formulae III or IV, or in any of the components of such composites described in Formulae I and II, the $(Li_{2-w}A_{1-v}Q_{w+v}O_{3-e})$ component can have a layered structure, and/or the $(Li_yMn_{2-z}M_zO_{4-d})$ component can have a spinel structure.

An electrochemical cell containing an electrode prepared from a composite material hereof is fabricated from elements that include (i) a housing; (ii) both electrodes (anode and a cathode); (iii) an electrolyte composition providing an ionically conductive pathway between the anode and the cathode wherein both electrodes are disposed in the electrolyte composition and are thus in ionically conductive contact with one another; and (iv) a porous separator between the anode and the cathode. The housing may be any suitable container to hold the components of the electrochemical cell in place.

The porous separator serves to prevent short circuiting between the anode and the cathode. The porous separator typically consists of a single-ply or multi-ply sheet of a microporous polymer. The pore size of the porous separator is sufficiently large to permit transport of ions, but small enough to prevent contact of the anode and cathode either directly or from particle penetration or dendrites which can form on the anode and cathode.

Examples of anode-active materials suitable for use to prepare an electrochemical cell as described herein, which will function to store and release lithium ions, include without limitation aluminum; platinum; palladium; lithium metal; lithiated carbon; lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; and lithium titanates such as $Li_4Ti_5O_{12}$ and $LiTi_2O_4$. In one embodiment, a desirable anode-active material includes lithium titanate or graphite. Suitable anode-active materials and anodes are available commercially from companies such as Hitachi Chemical (Tokyo, Japan), BTR New Energy Materials (Tianjin, China), NEI Inc. (Somerset, N.J.), and Farasis Energy Inc. (Hayward, Calif.).

In an electrochemical cell as disclosed herein, it is preferred that the cathode be prepared from a composite material hereof.

An electrode for use in an electrochemical cell as disclosed herein can be prepared, for example, by mixing an effective amount of the electro-active material (e.g. about 70-96 wt %), a polymer binder (e.g. a vinyl fluoride-based copolymer such as polyvinylidene difluoride), and conductive carbon in a suitable solvent, such as N-methylpyrrolidone, to generate a paste. The paste is coated onto a metal foil, preferably aluminum or copper foil, to be used as the current collector. The paste is dried, preferably with heat, so that the active mass is bonded to the current collector, thus forming the electrode.

An electrochemical cell as disclosed herein further contains an electrolyte composition, typically a nonaqueous electrolyte composition, which is a chemical composition suitable for use to provide ionic conductivity. The electrolyte composition typically contains at least one nonaqueous solvent and at least one electrolyte salt. The electrolyte salt is an ionic salt, or mixture of salts, that is at least partially soluble in the solvent of the nonaqueous electrolyte composition and that at least partially dissociates into ions in the solvent of the nonaqueous electrolyte composition to form a conductive electrolyte composition. The conductive electrolyte composition puts the cathode and anode in ionically conductive contact with one another such that ions, in particular lithium ions, are free to move between the anode and the cathode and thereby conduct charge through the electrolyte composition between the anode and the cathode. Suitable electrolyte salts include without limitation:

lithium hexafluorophosphate,
$LiPF_3(CF_2CF_3)_3$,
lithium bis(trifluoromethanesulfonyl)imide,
lithium bis(perfluoroethanesulfonyl)imide,
lithium (fluorosulfonyl) (nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
$Li_2B_{12}F_{12-x}H_x$ where x is equal to 0 to 8, and
a mixture of lithium fluoride and an anion receptor.

Any suitable electrolyte solvent, or mixtures thereof, can be used in the formation of an electrolyte composition, examples of which include without limitation ethylene carbonate, propylene carbonate, diethyl carbonate, dimethyl carbonate, ethylmethyl carbonate and dimethoxyethane. Other suitable electrolyte solvents include fluorinated solvents such as fluorinated ethers, fluorinated acyclic carboxylic acid esters, fluorinated acyclic carbonates, and fluorinated cyclic carbonates.

Fluorinated acyclic carboxylic acid esters suitable for use herein as a solvent, or in a mixture of solvents, can be a compound represented by the structure of the following formula:

$R^1$—C(O)O—$R^2$ wherein $R^1$ is selected from the group consisting of $CH_3$, $CH_2CH_3$, $CH_2CH_2CH_3$, $CH(CH_3)_2$, $CF_3$, $CF_2H$, $CFH_2$, $CF_2R^3$, $CFHR^3$, and $CH_2R^f$; and $R^2$ is independently selected from the group consisting of $CH_3$, $CH_2CH_3$, $CH_2CH_2CH_3$, $CH(CH_3)_2$, and $CH_2R^f$;
$R^3$ is a $C_1$ to $C_3$ alkyl group which is optionally substituted with at least one fluorine; and
$R^f$ is a $C_1$ to $C_3$ alkyl group substituted with at least one fluorine;
provided that at least one of $R^1$ or $R^2$ contains at least one fluorine, and when $R^1$ is $CF_2H$, $R^2$ is not $CH_3$.

Examples of particular fluorine-containing carboxylic acid esters suitable for use herein as a solvent include those wherein
$R^1$ is $CH_3CH_2$— and $R^2$ is —$CH_2CHF_2$,
$R^1$ is $CH_3$— and $R^2$ is —$CH_2CH_2CHF_2$,
$R^1$ is $CH_3CH_2$— and $R^2$ is —$CH_2CH_2CHF_2$, or
$R^1$ is $CHF_2CH_2CH_2$— and $R^2$ is —$CH_2CH_3$.

In other embodiments, a co-solvent in a mixture can be a fluorine-containing carboxylic acid ester represented by the formula: $R_4$—COO—$R_5$, where $R_4$ and $R_5$ independently represent an alkyl group, the sum of carbon atoms in $R_4$ and $R_5$ is 2 to 7, at least two hydrogens in $R_4$ and/or $R_5$ are replaced by fluorines and neither $R_4$ nor $R_5$ contains a $FCH_2$ or FCH group. The presence of a monofluoroalkyl group (i.e., $FCH_2$ or FCH) in the carboxylic acid ester is believed to cause toxicity. Suitable co-solvents thus include without limitation $CH_3$—COO—$CH_2CF_2H$(2,2-difluoroethyl acetate), $CH_3CH_2$—COO—$CH_2CF_2H$(2,2-difluoroethyl propionate), $F_2CHCH_2$—COO—$CH_3$(methyl 3,3-difluoropropionate), $F_2CHCH_2$—COO—$CH_2CH_3$(ethyl 3,3-difluoropropionate), $CH_3$—COO—$CH_2CH_2CF_2H$(3,3-difluoropropyl acetate), $CH_3CH_2$—COO—$CH_2CH_2CF_2H$(3,3-difluoropropyl propionate), and $F_2CHCH_2CH_2$—COO—$CH_2CH_3$(ethyl 4,4-difluorobutanoate). In some embodiments, the co-solvent is $CH_3$—COO—$CH_2CF_2H$(2,2-difluoroethyl acetate) or $CH_3CH_2$—COO—$CH_2CF_2H$(2,2-difluoroethyl propionate).

In one embodiment, the solvent mixture of the nonaqueous electrolyte composition comprises ethylene carbonate and $CH_3$—COO—$CH_2CF_2H$(2,2-difluoroethyl acetate) or $CH_3CH_2$—COO—$CH_2CF_2H$ (2,2-difluoroethyl propionate) at a weight ratio of about 30:70 and contains a phosphate additive at about 1% by weight.

Fluorinated acyclic carbonates suitable for use herein as a solvent can be a compound represented by the structure of the following formula:

$R^4$—O—C(O)O—$R^5$ wherein $R^4$ and $R^5$ are independently selected from the group consisting of $CH_3$, $CH_2CH_3$, $CH_2CH_2CH_3$, $CH(CH_3)_2$, and $CH_2R^f$ where $R^f$ is a $C_1$ to $C_3$ alkyl group substituted with at least one fluorine, and further wherein at least one of $R^4$ or $R^5$ contains at least one fluorine.

Examples of suitable fluorinated cyclic carbonates include fluoroethylene carbonate, or a compound represented by the structure of the following formula:

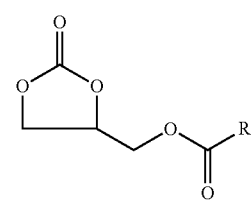

wherein R is $C_1$ to $C_4$ fluoroalkyl group.

Other suitable electrolyte solvents are described further in U.S. Provisional Patent Application Nos. 61/530,545 and 61/654,190, each of which is by this reference incorporated in its entirety as a part hereof for all purposes.

The electrochemical cells disclosed herein may be used as a power source in various electronic devices and articles such as computers, power tools, wind and solar farms, vehicles for transportation (automobiles, buses, trains, ships and airplanes) and telecommunication devices.

EXAMPLES

The operation and effects of certain embodiments of the inventions hereof may be more fully appreciated from a series of examples (Examples 1, 2 and 11~15), as described below. The embodiments on which these examples are based are representative only, and the selection of those embodiments to illustrate the invention does not indicate that materials, components, reactants, conditions or specifications not described in the examples are not suitable for use herein, or that subject matter not described in the examples is excluded from the scope of the appended claims and equivalents thereof. The significance of the examples is better understood by comparing the results obtained therefrom with the results obtained from certain formulations that are designed to serve as controlled experiments (Examples 3~8) and provide a basis for such comparison since are characterized by a different compositional content.

The meaning of abbreviations used is as follows: "g" means gram(s), "mg" means milligram(s), "µg" means microgram(s), "L" means liter(s), "mL" means milliliter(s), "mol" means mole(s), "mmol" means millimole(s), "M" means molar concentration, "wt %" means percent by weight, "Hz" means hertz, "mS" means millisiemen(s), "mA" mean milliamp(s), "mAh/g" mean milliamp hour(s) per gram, "V" means volt(s), "SOC" means state of charge, "SEI" means solid electrolyte interface formed on the surface of the electrode material, "rpm" means revolutions per minute.
Preparation of Cathodes A cathode active material (1.04 g), prepared as described below, 0.13 g of Denka black (acetylene black, obtained from DENKA Corp., Japan), 1.08 g of polyvinylidene difluoride (PVDF) solution (12 wt % in N-methylpyrrolidone (NMP), Kureha America Inc., New York, N.Y., KFL#1120), and an additional 2.3 g of NMP were mixed first using a planetary centrifugal mixer (THINKY ARE-310, THINKY Corp., Japan) at 2000 rpm and then using a shear mixer (IKA® Works, Wilmington, N.C.) to form a uniform slurry. The slurry was coated on aluminum foil by using a doctor blade gate, and then dried in a convection oven at 100° C. for 10 to 15 min. The resulting electrode was further dried in a vacuum oven at 90° C. at −25 inches of Hg (−85 kPa) for 6 h after roll calendaring at 15 psi.
Fabrication of Composite Cathode/Li Anode Half Cells A cathode, prepared as described above, a Celgard® separator 2325 (Celgard, LLC. Charlotte, N.C.), a lithium foil anode (0.75 mm in thickness) and a few drops of the non-aqueous electrolyte composition were sandwiched in 2032 stainless steel coin cell cans (Hohsen Corp., Japan) to form the cathode/Li anode half cells.

Example 1 (Comparative)

Preparation of $LiMn_{1.5}Ni_{0.5}O_4$ Cathode Active Material 2.608 g $MnO_2$, 0.747 g Ni, and 0.739 g $Li_2CO_3$ were mixed by Spex mixer (model 800M, SPEX CertiPrep Metuchen, N.J.) for 1 hour. Next, 0.848 g LiCl was introduced (as flux agent) into the mixture in a 1:1 molar ratio with the total moles of Li and Mn. The mixture was heated at 900° C. in air for 6 h with a heating/cooling rate of 2° C./min/1° C./min. The resulting material was rinsed with DI water and dried at 100° C.

Example 2

Preparation of $0.03Li_2MnO_3 \cdot 0.97LiMn_{1.5}Ni_{0.5}O_4$ Cathode Active Material 2.582 g $MnO_2$, 0.725 g NiO, and 0.761 g $Li_2CO_3$ were mixed by Spex mixer for 1 hour. Next, 0.848 g LiCl was introduced (as flux agent) into the mixture in a 1:1 molar ratio with the total moles of Li and Mn. The mixture was heated at 900° C. in air for 6 h with a heating/cooling rate of 2° C./min/1° C./min. The resulting material was rinsed with DI water and dried at 100° C.

Example 3

Preparation of $0.1Li_2MnO_3 \cdot 0.9LiMn_{1.5}Ni_{0.50}O_4$ Cathode Active Material 2.521 g $MnO_2$, 0.672 g NiO, and 0.813 g $Li_2CO_3$ were mixed by Spex mixer for 1 hour. Next, 0.848 g LiCl was introduced (as flux agent) into the mixture in a 1:1 molar ratio with the total moles of Li and Mn. The mixture was heated at 900° C. in air for 6 h with a heating/cooling rate of 2° C./min/1° C./min. The resulting material was rinsed with DI water and dried at 100° C.

Example 4 (Comparative)

Preparation of $0.5Li_2MnO_3 \cdot 0.5LiMn_{1.5}Ni_{0.5}O_4$ Cathode Active Material 2.174 g $MnO_2$, 0.374 g NiO, and 1.108 g $Li_2CO_3$ were mixed by Spex mixer for 1 hour. Next, 0.848 g LiCl was introduced (as flux agent) into the mixture in a 1:1 molar ratio with the total moles of Li and Mn. The mixture was heated at 900° C. in air for 6 h with a heating/cooling rate of 2° C./min/1° C./min. The resulting material was rinsed with DI water and dried at 100° C.

Example 5

Preparation of $0.03Li_2MnO_3 \cdot 0.97LiMn_{1.5}Ni_{0.45}Fe_{0.05}O_4$ Cathode Active Material 2.582 g $MnO_2$, 0.652 g NiO, 0.077 g $Fe_2O_3$, and 0.761 g $Li_2CO_3$ were mixed by Spex mixer for 1 hour. Next, 0.848 g LiCl was introduced (as flux agent) into the mixture in a 1:1 molar ratio with the total moles of Li and Mn. The mixture was heated at 900° C. in air for 6 h with a heating/cooling rate of 2° C./min/1° C./min. The resulting material was rinsed with DI water and dried at 100° C.

Example 6

X-Ray Diffraction Pattern of $0.03Li_2MnO_3 \cdot 0.97LiMn_{1.5}Ni_{0.5}O_4$

The x-ray diffraction (XRD) pattern of the $0.03Li_2MnO_3 \cdot 0.97LiMn_{1.5}Ni_{0.5}O_4$ composite is shown in FIG. 1. The cubic spinel phase was ascribed to $LiMn_{1.5}Ni_{0.5}O_4$, and the layered phase was ascribed to $Li_2MnO_3$. The composition as determined by XRD agrees with the calculated composition based on the stoichiometry of the starting materials.

Example 7

Charge-Discharge Curve of $0.03Li_2MnO_3 \cdot 0.97LiMn_{1.5}Ni_{0.5}O_4$

Figure 2:
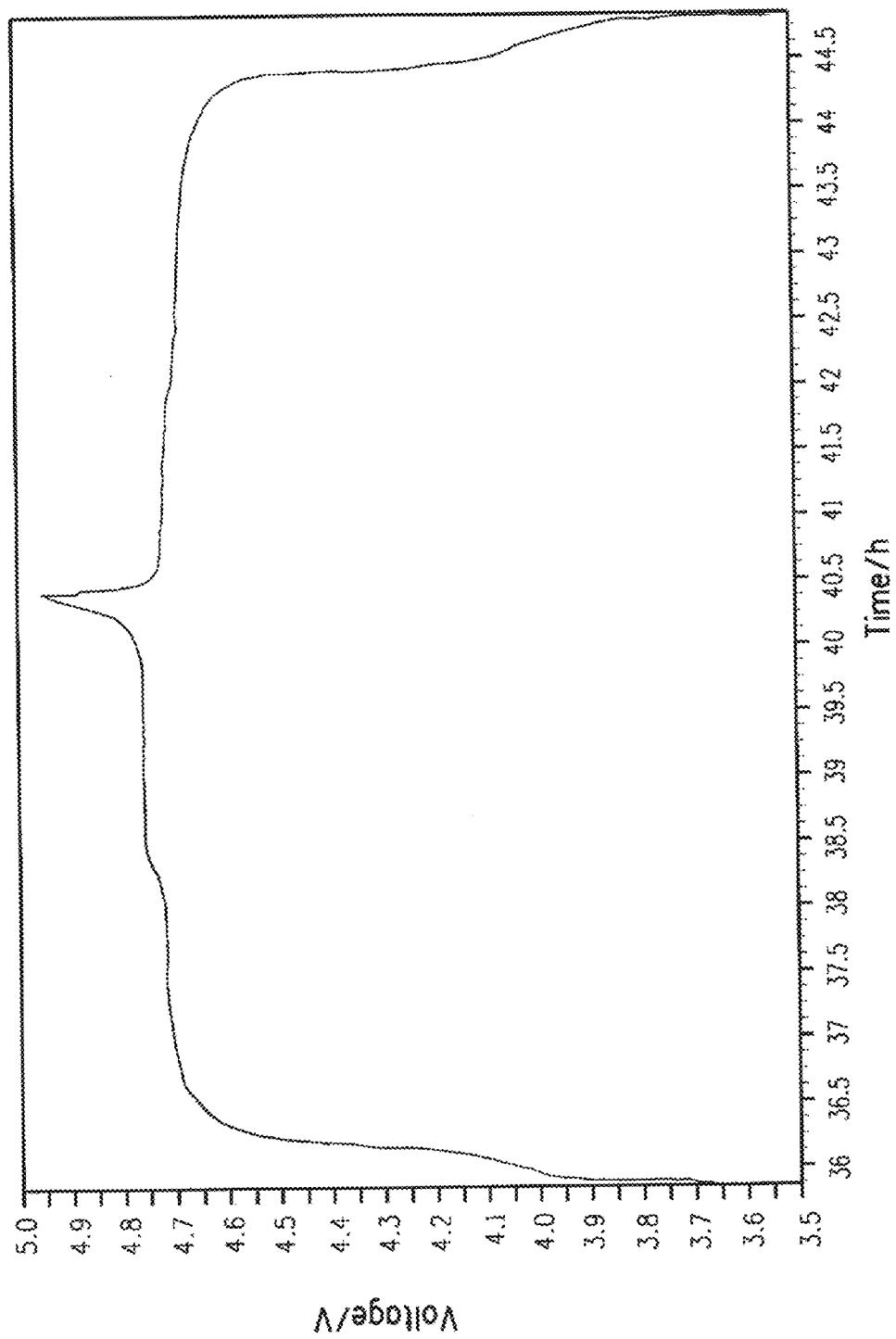
FIG. 2 is a charge-discharge curve obtained from testing the $0.03Li_2MnO_3\cdot0.97LiMn_{1.5}Ni_{0.5}O_4$ composite material as a cathode material.

A $0.03Li_2MnO_3 \cdot 0.97LiMn_{1.5}Ni_{0.5}O_4$/Li half cell was prepared as described above using an electrolyte containing ethyl carbonate (EC)/ethyl methyl carbonate (EMC) in a volume ratio of 30:70 and 1M $LiPF_6$ (Novolyte, Cleveland, Ohio). This half-cell was cycled between 3.5 and 4.95 V at 30 mA/g and 25° C. A typical charge-discharge curve is shown in FIG. 2. The typical curves were taken after 2 to 3 formation cycles. The voltage plateau at ~4.7 V was observed, and the discharge capacity was calculated to be ~130 mAh/g.

Example 8 (Comparative)

X-Ray Diffraction Pattern of $LiMn_{1.5}Ni_{0.5}O_4$

Figure 3:
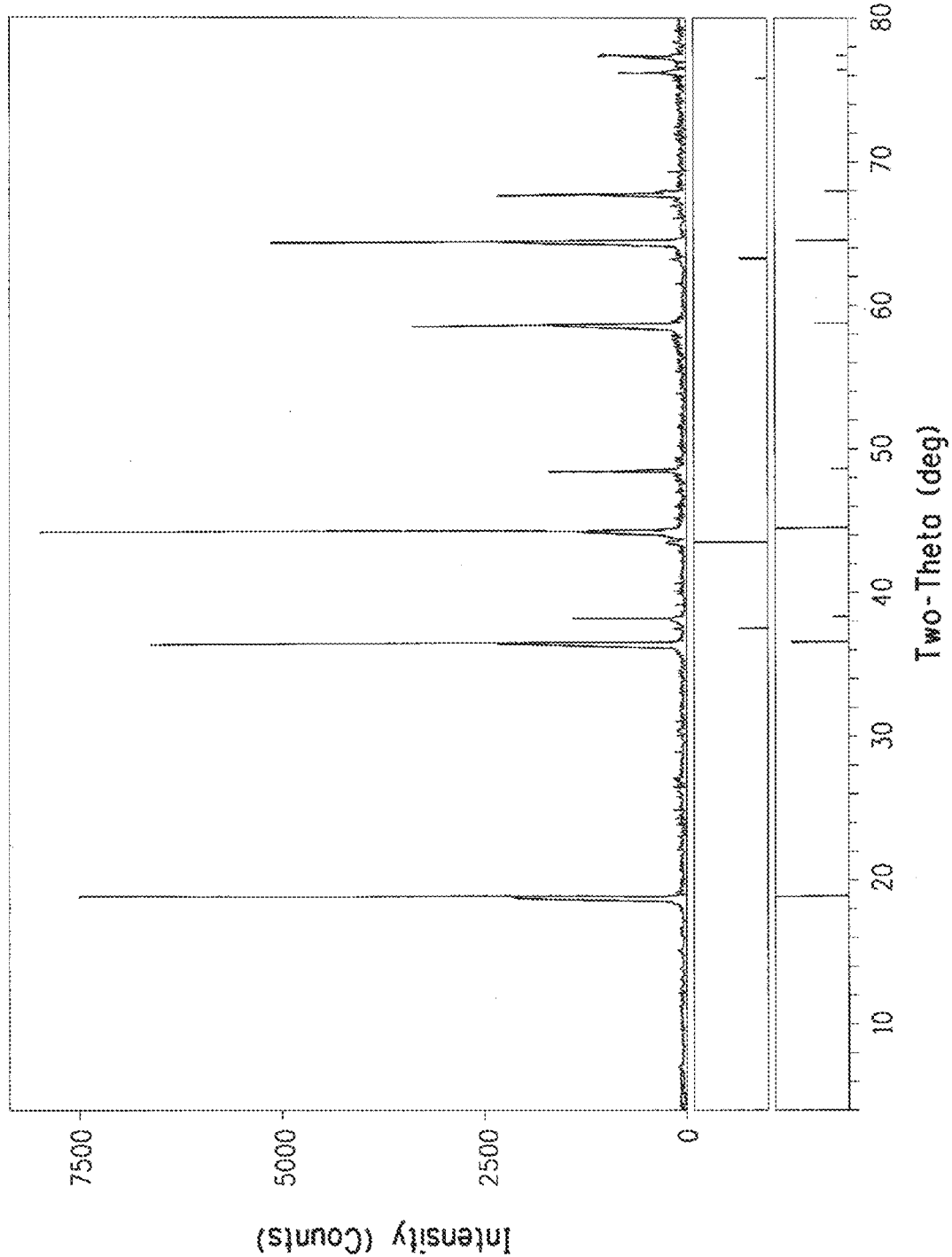
FIG. 3 is an x-ray diffraction pattern of the $LiMn_{1.5}Ni_{0.5}O_4$ compound. The bottom two panels show calculated XRD patterns; The upper calculated pattern is that of $Li_xNi_{1-x}O$. The lower calculated pattern is that of spinel $LiMn_{1.5}Ni_{0.5}O_4$.

The XRD pattern of the $LiMn_{1.5}Ni_{0.5}O_4$ is shown in FIG. 3. The cubic spinel phase was ascribed to $LiMn_{1.5}Ni_{0.5}O_4$. A small amount of $Li_{1-x}Ni_xO$ impurity was observed. The composition as determined by XRD agrees with the calculated composition based on the stoichiometry of the starting materials.

Example 9 (Comparative)

Charge-Discharge Curve of $LiMn_{1.5}Ni_{0.5}O_4$

Figure 4:
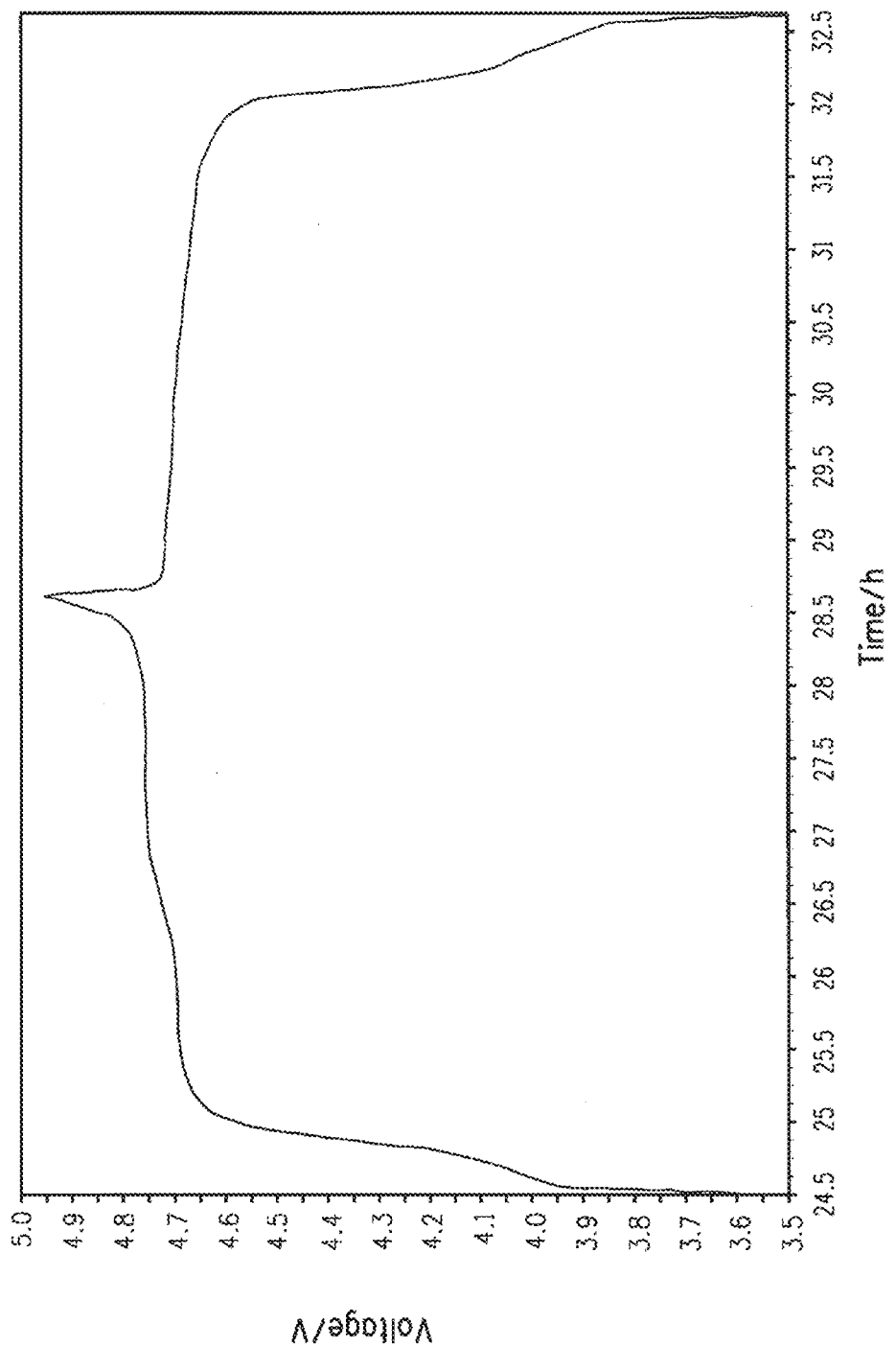
FIG. 4 a charge-discharge curve obtained from testing the $LiMn_{1.5}Ni_{0.5}O_4$ compound as a cathode material.

A $LiMn_{1.5}Ni_{0.5}O_4$/Li half cell was prepared as described above using an electrolyte containing ethyl carbonate (EC)/ethyl methyl carbonate (EMC) in a volume ratio of 30:70 and 1M $LiPF_6$ (Novolyte, Cleveland, Ohio). This half-cell was cycled between 3.5 and 4.95 V at 30 mA/g and 25° C. A typical charge-discharge curve is shown in FIG. 4. The voltage plateau at ~4.7 V was observed, and the discharge capacity was calculated to be ~128 mAh/g. The capacity was similar to that of $0.03Li_2MnO_3 \cdot 0.97LiMn_{1.5}Ni_{0.5}O_4$, as $LiMn_{1.5}Ni_{0.5}O_4$ has a few percent $Li_{1-x}Ni_xO$ impurity (see FIG. 3).

Example 10 (Comparative)

X-Ray Diffraction Pattern of $0.1Li_2MnO_3 \cdot 0.9LiMn_{1.5}Ni_{0.5}O_4$

Figure 5:
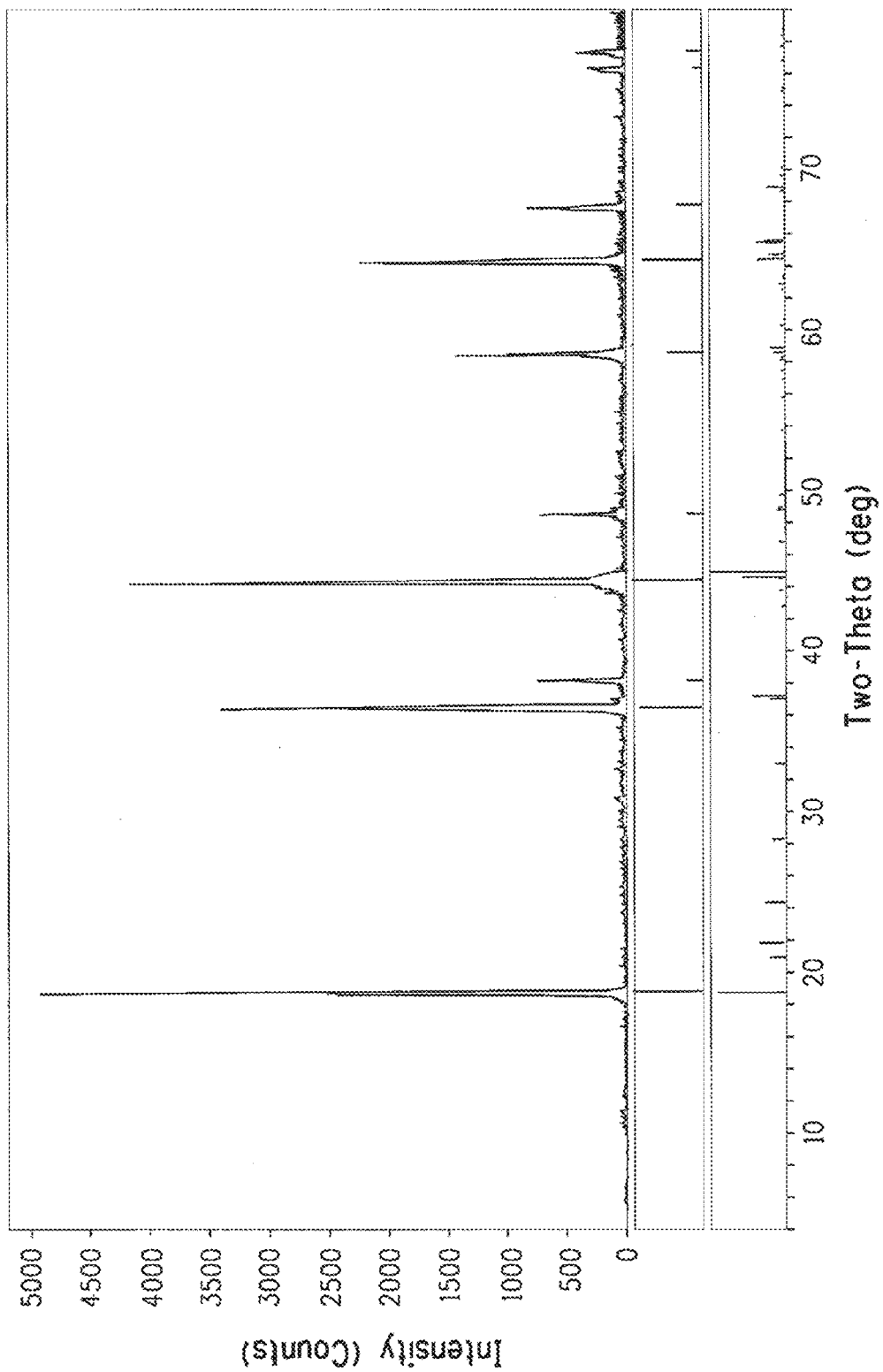
FIG. 5 is a x-ray diffraction (XRD) pattern of the $0.1Li_2MnO_3\cdot0.9LiMn_{1.5}Ni_{0.5}O_4$ composite material. The bottom two panels show calculated XRD patterns. The upper calculated pattern is that of spinel $LiMn_{1.5}Ni_{0.5}O_4$; The lower calculated pattern is that of layered $Li_2MnO_3$.

The x-ray diffraction (XRD) pattern of the $0.1Li_2MnO_3 \cdot 0.9LiMn_{1.5}Ni_{0.5}O_4$ composite is shown in FIG. 5. The cubic spinel phase was ascribed to $LiMn_{1.5}Ni_{0.5}O_4$, and the layered phase was ascribed to $Li_2MnO_3$. The composition as determined by XRD agrees with the calculated composition based on the stoichiometry of the starting materials.

Example 11 (Comparative)

Charge-Discharge Curve of $0.1Li_2MnO_3 \cdot 0.9LiMn_{1.5}Ni_{0.5}O_4$

Figure 6:
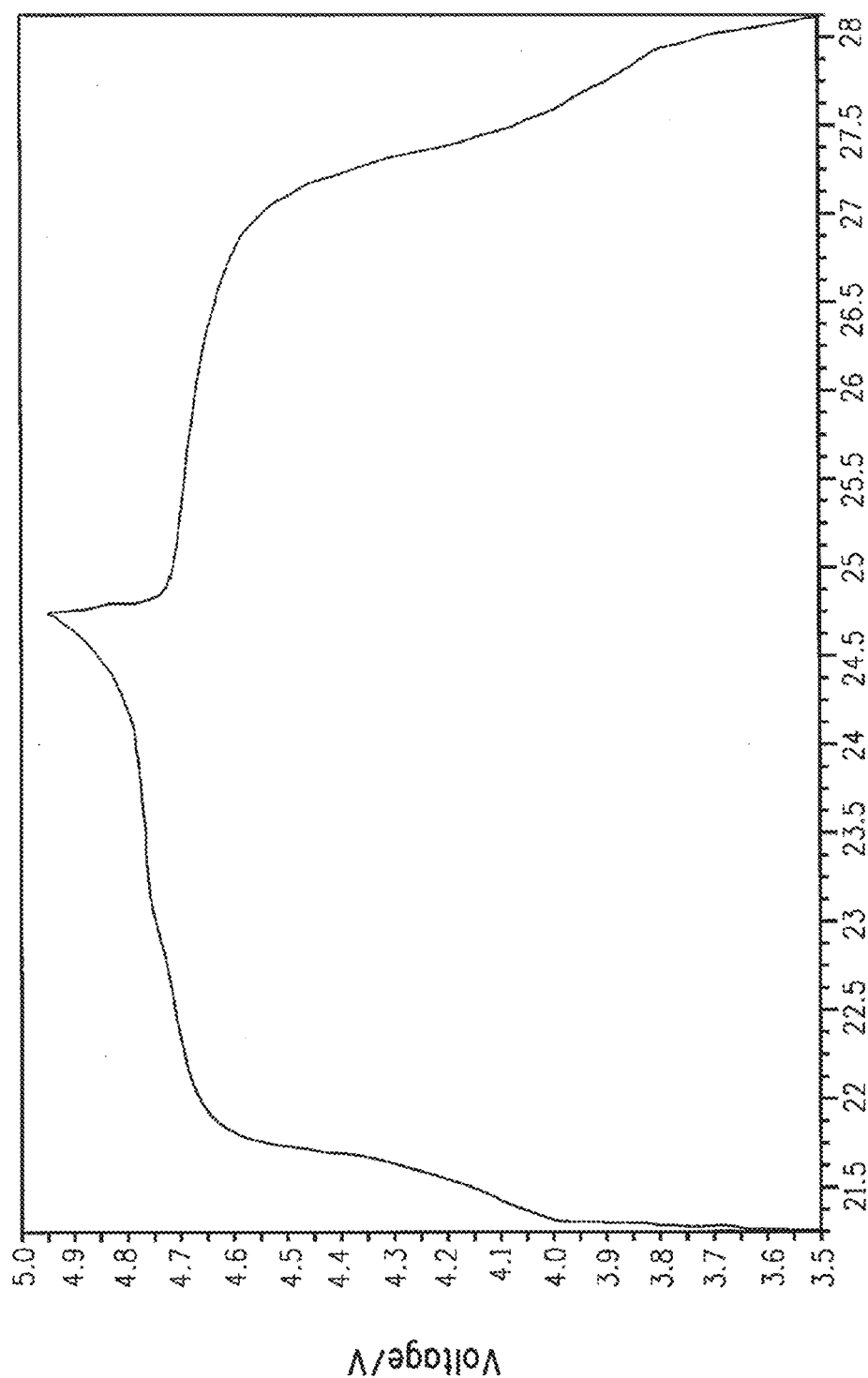
FIG. 6 is a charge-discharge curve obtained from testing the $0.1Li_2MnO_3\cdot0.9LiMn_{1.5}Ni_{0.5}O_4$ composite material as a cathode material.

A $0.1Li_2MnO_3 \cdot 0.9LiMn_{1.5}Ni_{0.5}O_4$/Li half cell was prepared as described above using an electrolyte containing ethyl carbonate (EC)/ethyl methyl carbonate (EMC) in a volume ratio of 30:70 and 1M $LiPF_6$ (Novolyte, Cleveland, Ohio). This half-cell was cycled between 3.5 and 4.95 V at 30 mA/g and 25° C. A typical charge-discharge curve is shown in FIG. 6. A voltage plateau at ~4.7 V was observed, and the discharge capacity was calculated to be ~101 mAh/g, which is much lower than the capacity of $0.03Li_2MnO_3 \cdot 0.97LiMn_{1.5}Ni_{0.5}O_4$ (~130 mAh/g).

This low capacity also demonstrates the negligible electrochemical activity and poor electronic and Li ion conductivities of the $Li_2MnO_3$ phase. It also indicates that only a small amount of $Li_2MnO_3$ was needed for optimizing the electrochemical performance of the composite cathode by balancing the chemical stability and the conductivities.

Example 12 (Comparative)

X-Ray Diffraction Pattern of $0.5Li_2MnO_3 \cdot 0.5LiMn_{1.5}Ni_{0.5}O_4$

Figure 7:
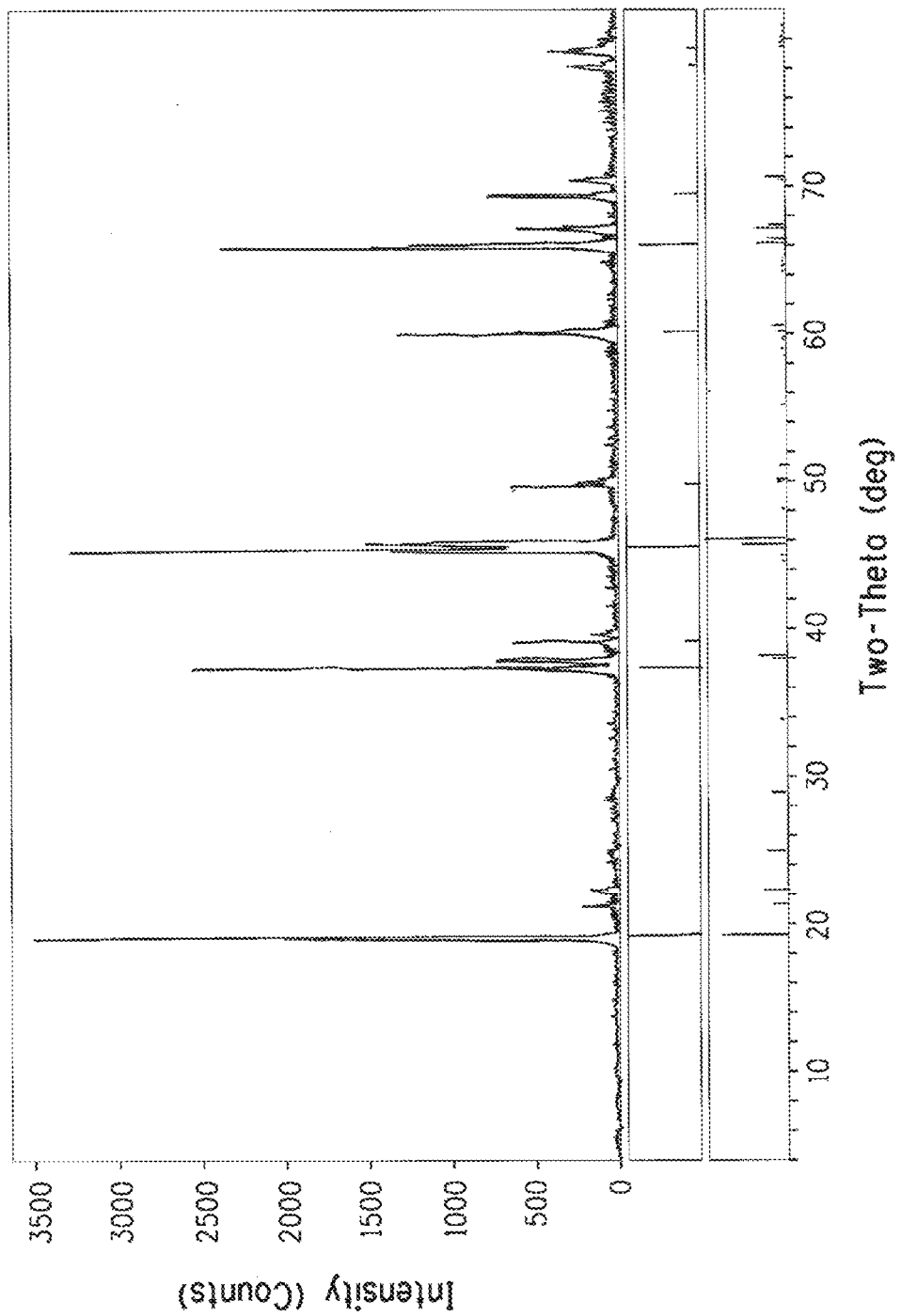
FIG. 7 is an x-ray diffraction pattern of the $0.5Li_2MnO_3\cdot0.5LiMn_{1.5}Ni_{0.5}O_4$ composite material. The bottom two panels show calculated XRD patterns. The upper calculated pattern is that of spinel $LiMn_{1.5}Ni_{0.5}O_4$. The lower calculated pattern is that of layered $Li_2MnO_3$.

The x-ray diffraction (XRD) pattern of the $0.5Li_2MnO_3 \cdot 0.5LiMn_{1.5}Ni_{0.5}O_4$ composite is shown in FIG. 7. The cubic spinel phase was ascribed to $LiMn_{1.5}Ni_{0.5}O_4$, and the layered phase was ascribed to $Li_2MnO_3$. The composition as determined by XRD agrees with the calculated composition based on the stoichiometry of the starting materials.

Example 13 (Comparative)

Charge-Discharge Curve of $0.5Li_2MnO_3 \cdot 0.5LiMn_{1.5}Ni_{0.5}O_4$

Figure 8:
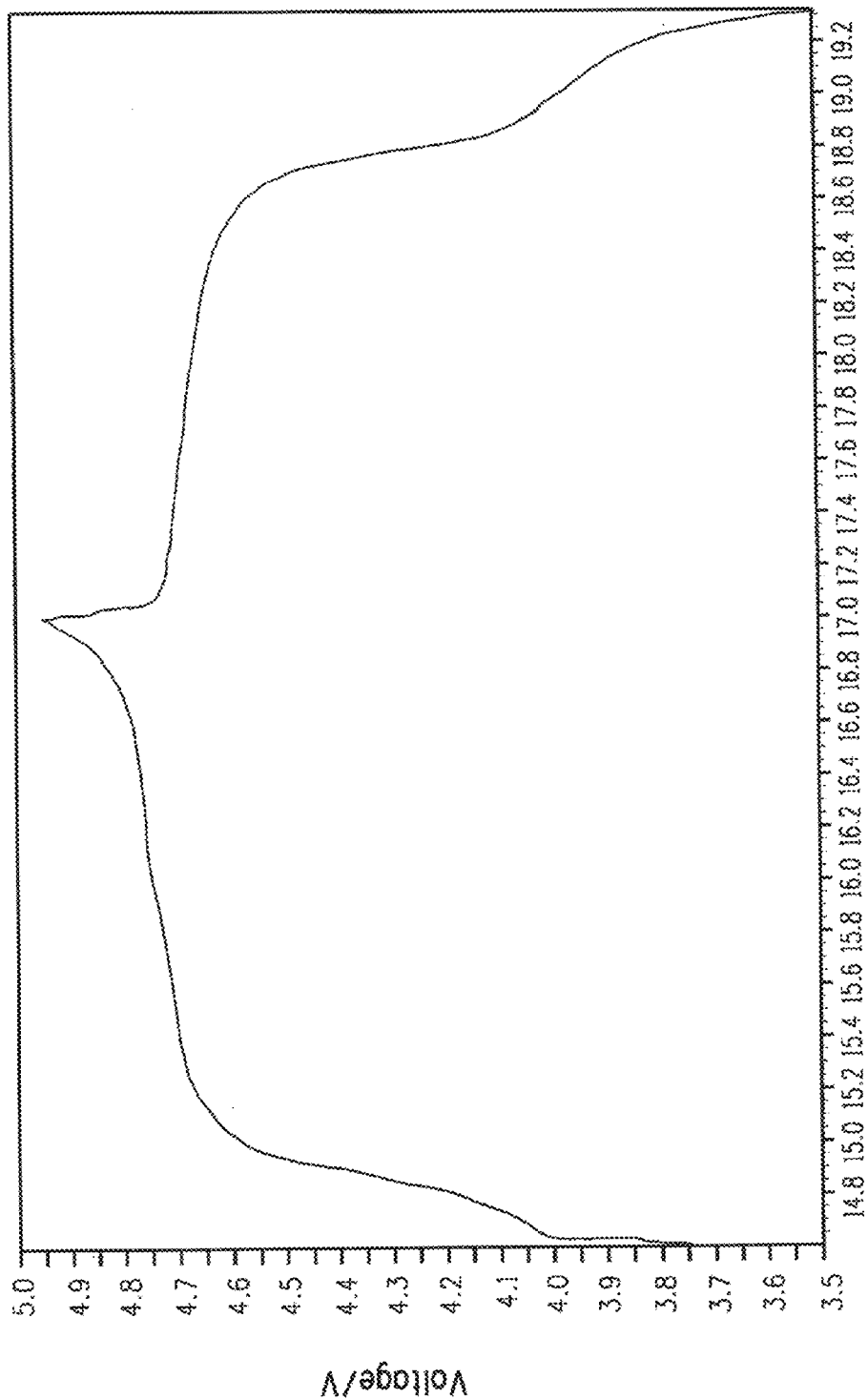
FIG. 8 is a charge-discharge curve obtained from testing the $0.5Li_2MnO_3\cdot0.5LiMn_{1.5}Ni_{0.5}O_4$ composite material as a cathode material.

A $0.5Li_2MnO_3 \cdot 0.5LiMn_{1.5}Ni_{0.5}O_4$/Li half cell was prepared as described above using an electrolyte containing ethyl carbonate (EC)/ethyl methyl carbonate (EMC) in a volume ratio of 30:70 and 1M $LiPF_6$ (Novolyte, Cleveland, Ohio). This half-cell was cycled between 3.5 and 4.95 V at 30 mA/g and 25° C. A typical charge-discharge curve is shown in FIG. 8. The voltage plateau at ~4.7 V was observed, and the discharge capacity was calculated to be ~70 mAh/g, which demonstrates the electrochemical inactivity of $Li_2MnO_3$, and that the capacity value is much lower than that of $0.03Li_2MnO_3 \cdot 0.97LiMn_{1.5}Ni_{0.5}O_4$ (~130 mAh/g).

Example 14

Cycling Performance Comparison of $xLi_2MnO_3 \cdot (1-x)LiMn_{1.5}Ni_{0.5}O_4$

Figure 9:
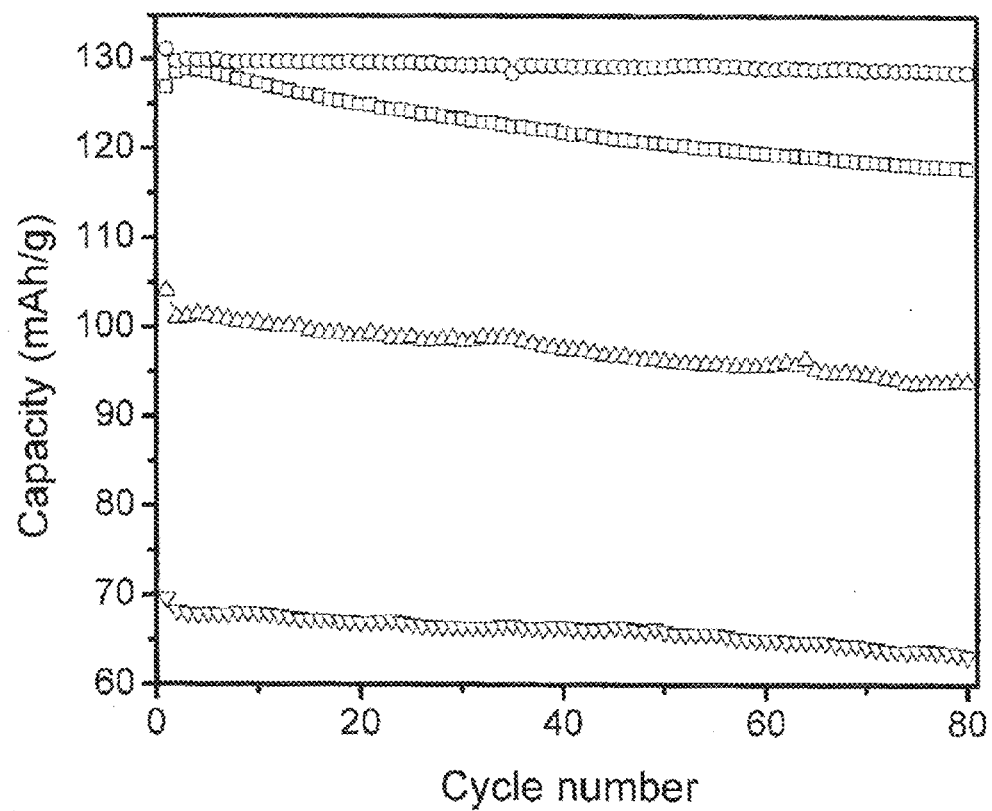
FIG. 9 compares the cycling performance of the $LiMn_{1.5}Ni_{0.5}O_4$ compound, the $0.03Li_2MnO_3\cdot0.97LiMn_{1.5}Ni_{0.5}O_4$ composite material, the $0.1Li_2MnO_3\cdot0.9LiMn_{1.5}Ni_{0.5}O_4$ composite material and the $0.5Li_2MnO_3\cdot0.5LiMn_{1.5}Ni_{0.5}O_4$ composite material.

The cycling performance of $LiMn_{1.5}Ni_{0.5}O_4$, $0.03Li_2MnO_3 \cdot 0.97LiMn_{1.5}Ni_{0.5}O_4$, $0.1Li_2MnO_3 \cdot 0.9LiMn_{1.5}Ni_{0.5}O_4$, and $0.5Li_2MnO_3 \cdot 0.5LiMn_{1.5}Ni_{0.5}O_4$ are compared in FIG. 9. It can be seen that the cycling performance first increased and then decreased with increasing amounts of $Li_2MnO_3$, indicating that small amounts of $Li_2MnO_3$ can improve the cycling performance of $LiMn_{1.5}Ni_{0.5}O_4$.

Example 15

Rate Capability Comparison of $xLi_2MnO_3 \cdot (1-x)LiMn_{1.5}Ni_{0.5}O_4$

Figure 10:
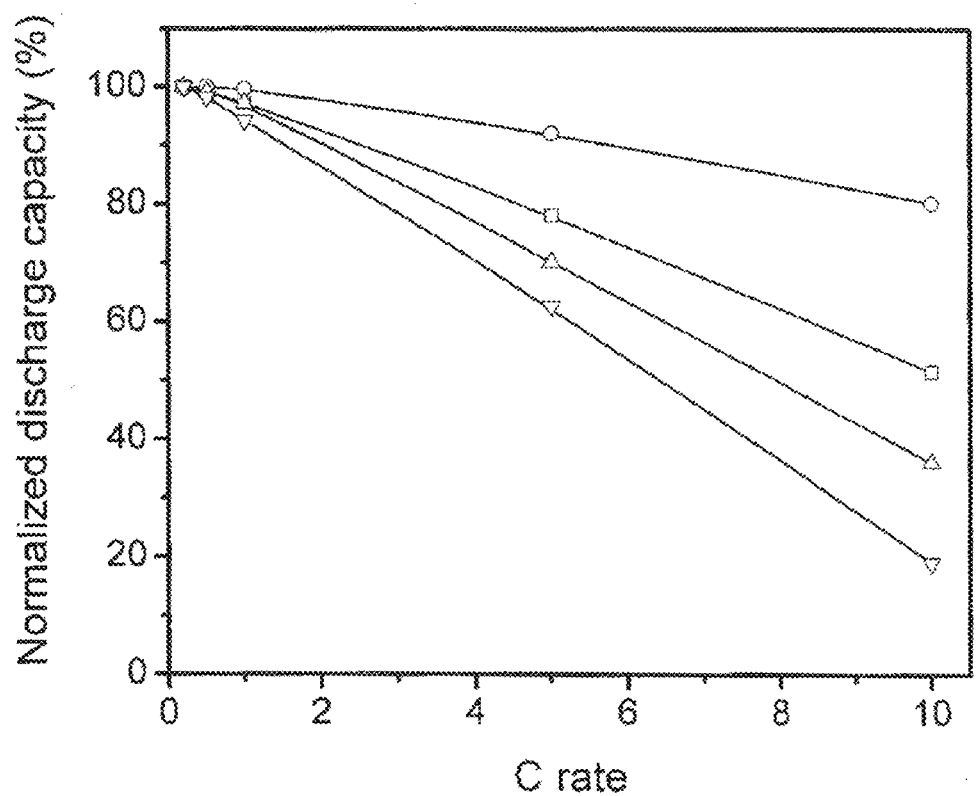
FIG. 10 compares the rate capability of the $LiMn_{1.5}Ni_{0.5}O_4$, compound, the $0.03Li_2MnO_3\cdot0.97LiMn_{1.5}Ni_{0.5}O_4$ composite material, the $0.1Li_2MnO_3\cdot0.9LiMn_{1.5}Ni_{0.5}O_4$ composite material, and the $0.5Li_2MnO_3\cdot0.5LiMn_{1.5}Ni_{0.5}O_4$ composite material.

The rate capability of $LiMn_{1.5}Ni_{0.5}O_4$, $0.03Li_2MnO_3 \cdot 0.97LiMn_{1.5}Ni_{0.5}O_4$, $0.1Li_2MnO_3 \cdot 0.9LiMn_{1.5}Ni_{0.5}O_4$, and $0.5Li_2MnO_3 \cdot 0.5LiMn_{1.5}Ni_{0.5}O_4$ are compared in FIG. 10.

The rate capability firstly increased and then decreased with increasing the amount of $Li_2MnO_3$, indicating that small amounts of $Li_2MnO_3$ can improve the rate capability of $LiMn_{1.5}Ni_{0.5}O_4$.

Example 16

Figure 11:
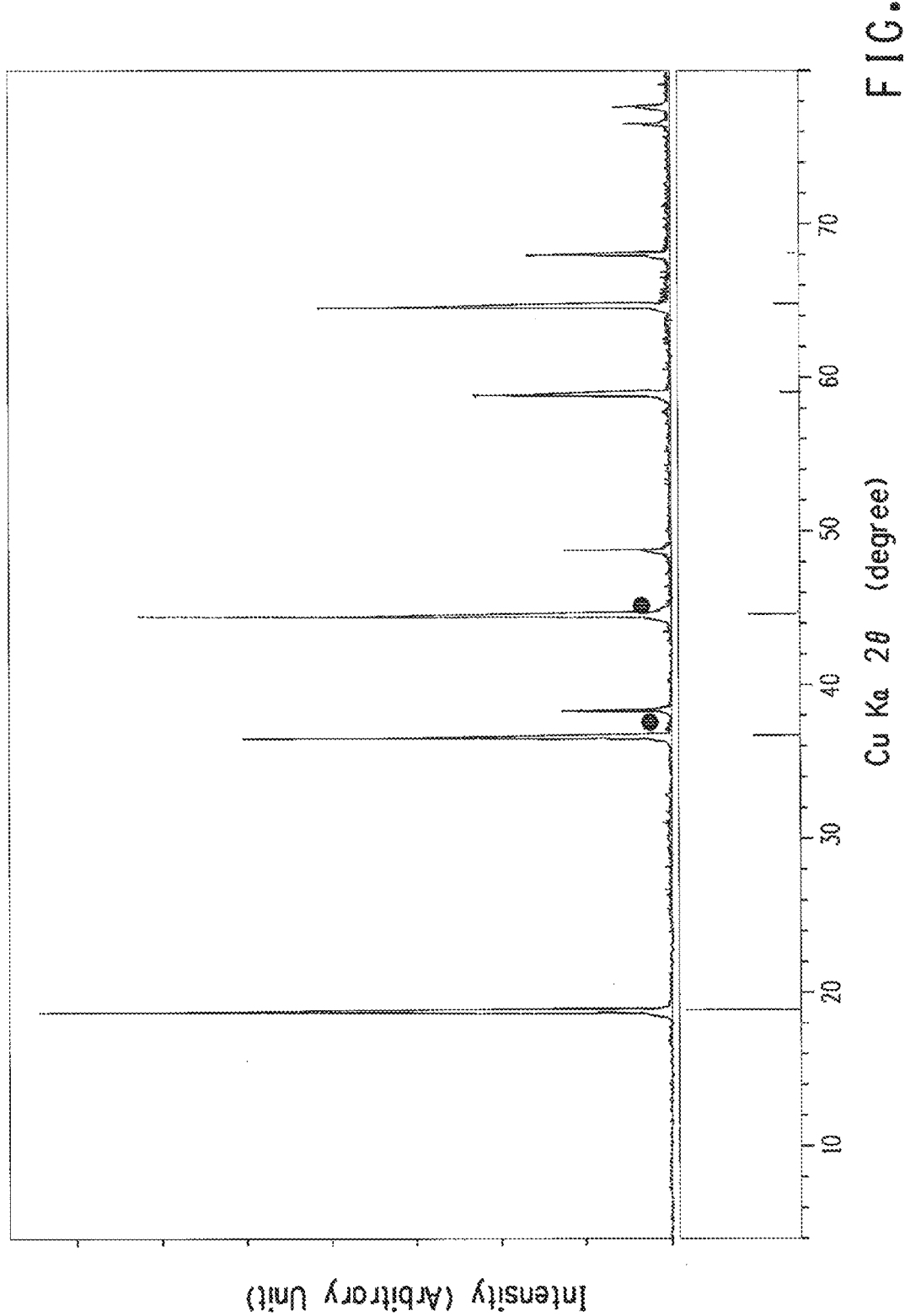
FIG. 11 an x-ray diffraction pattern of the $0.03Li_2MnO_3\cdot0.97LiMn_{1.5}Ni_{0.45}Fe_{0.05}O_4$ composite material. The lower panel shows a calculated diffraction pattern for spinel $LiMn_{1.5}Ni_{0.45}Fe_{0.05}O_4$.

X-Ray Diffraction Pattern of $0.03Li_2MnO_3 \cdot 0.97LiMn_{1.5}Ni_{0.45}Fe_{0.05}O_4$ The XRD pattern of the $0.03Li_2MnO_3 \cdot 0.97LiMn_{1.5}Ni_{0.45}Fe_{0.05}O_4$ composite is shown in FIG. 11. The cubic spinel phase was ascribed to $LiMn_{1.5}Ni_{0.45}Fe_{0.05}O_4$, and the layered phase was ascribed to $Li_2MnO_3$, where a small amount of Li and Mn are replaced by Ni. The composition as determined by XRD agrees with the calculated composition based on the stoichiometry of the starting materials.

Example 17

Figure 12A:
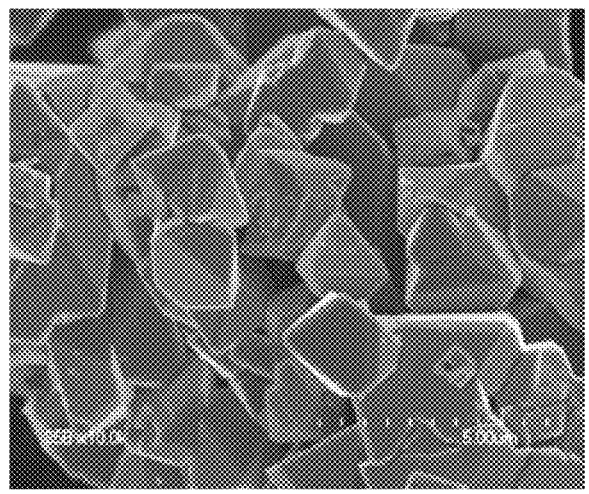
FIGS. 12a and 12b are scanning electron micrographs of the $0.03Li_2MnO_3\cdot0.97LiMn_{1.5}Ni_{0.45}Fe_{0.05}O_4$ composite material.
Figure 12B:
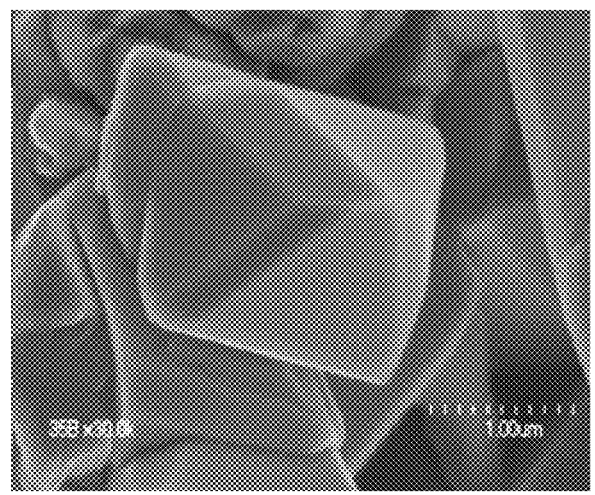

Scanning Microscopy of $0.03Li_2MnO_3 \cdot 0.97LiMn_{1.5}Ni_{0.45}Fe_{0.05}O_4$ The morphology of the $0.03Li_2MnO_3 \cdot 0.97LiMn_{1.5}Ni_{0.45}Fe_{0.05}O_4$ composite was studied by scanning electron microscopy and the result is shown in FIGS. 12a and 12b. The composite was crystallized in octahedral shape.

Example 18

Figure 13:
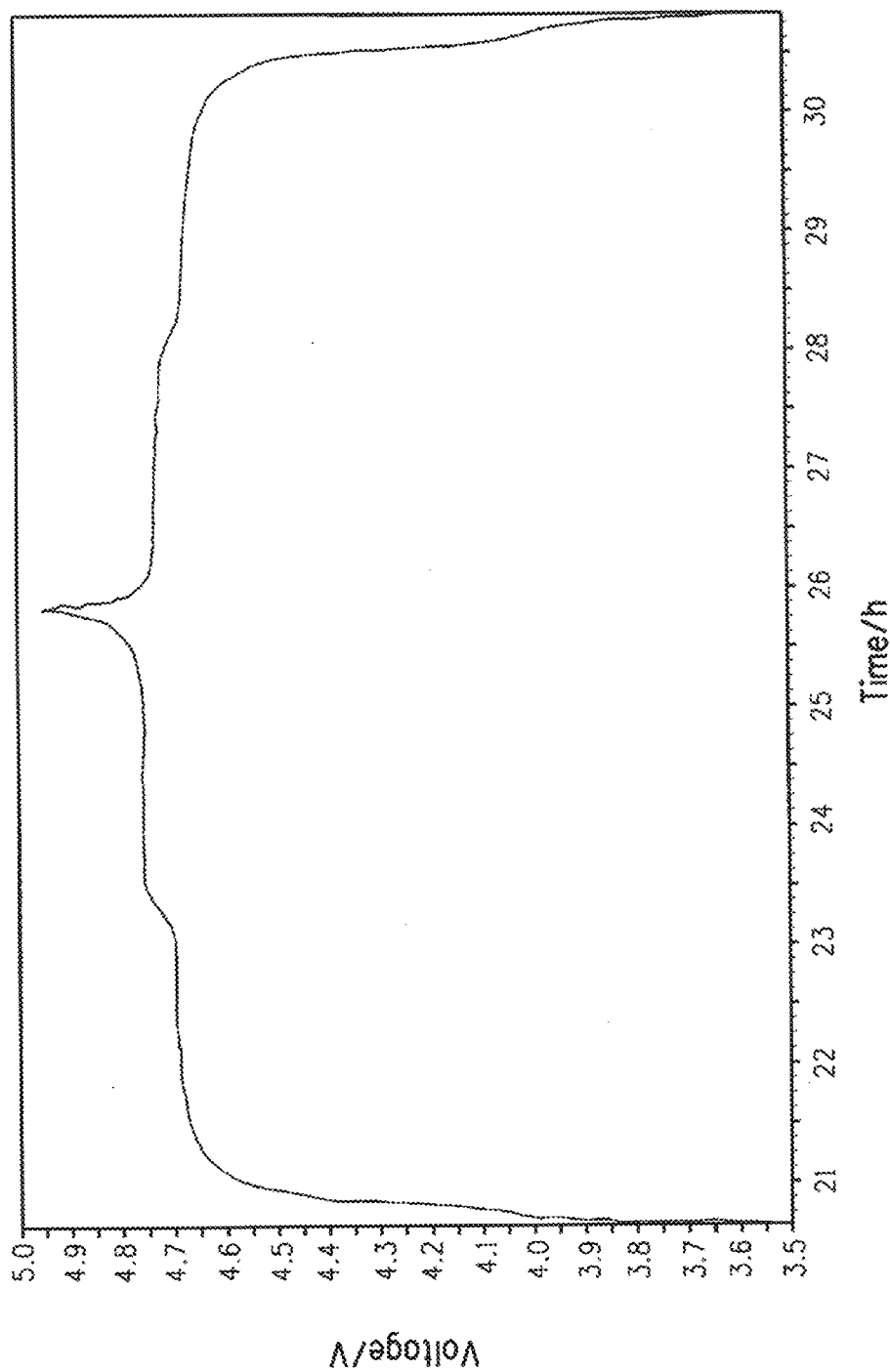
FIG. 13 is a charge-discharge curve obtained from testing the $0.03Li_2MnO_3\cdot0.97LiMn_{1.5}Ni_{0.45}Fe_{0.05}O_4$ composite material as a cathode material.

Charge-Discharge Curve of $0.03Li_2MnO_3 \cdot 0.97LiMn_{1.5}Ni_{0.45}Fe_{0.05}O_4$ A $0.03Li2MnO3 \cdot 0.97LiMn1.5Ni0.45Fe0.05O4$/Li half-cell was prepared as described above using an electrolyte containing ethyl carbonate (EC)/ethyl methyl carbonate (EMC) in a volume ratio of 30:70 and 1M LiPF6 (Novolyte, Cleveland, Ohio). This half-cell was cycled between 3.5 and 4.95 V at 30 mA/g and 25° C. The typical charge-discharge curve is shown in FIG. 13. A voltage plateau at ~4.7 V was observed, and the discharge capacity was calculated to be ~132 mAh/g.

Example 19

Figure 14:
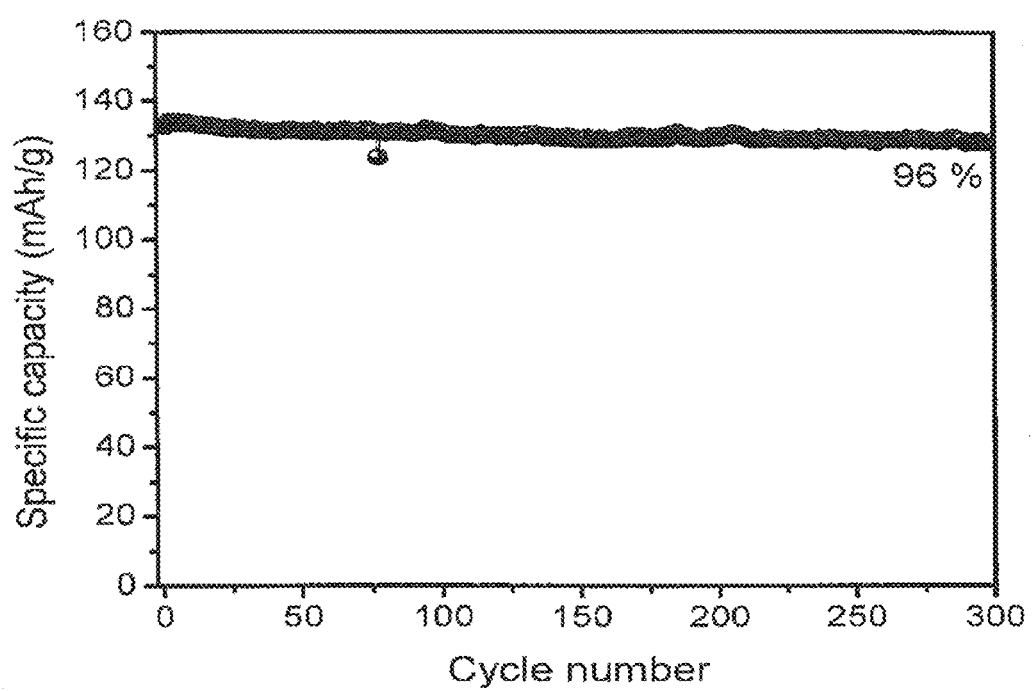
FIG. 14 shows the cycling performance of the $0.03Li_2MnO_3\cdot0.97LiMn_{1.5}Ni_{0.45}Fe_{0.05}O_4$ composite material when tested as a cathode material.

Cycling Performance of $0.03Li_2MnO_3 \cdot 0.97LiMn_{1.5}Ni_{0.45}Fe_{0.05}O_4$ The cycling performance of a $0.03Li_2MnO_3 \cdot 0.97LiMn_{1.5}Ni_{0.45}Fe_{0.05}O_4$ composite at room temperature is shown in FIG. 14. A capacity retention of ~96% was observed in 300 cycles, exhibiting a very good cycling performance.

Example 20

Rate Capability of $0.03Li_2MnO_3 \cdot 0.97LiMn_{1.5}Ni_{0.45}Fe_{0.05}O_4$

Figure 15A:
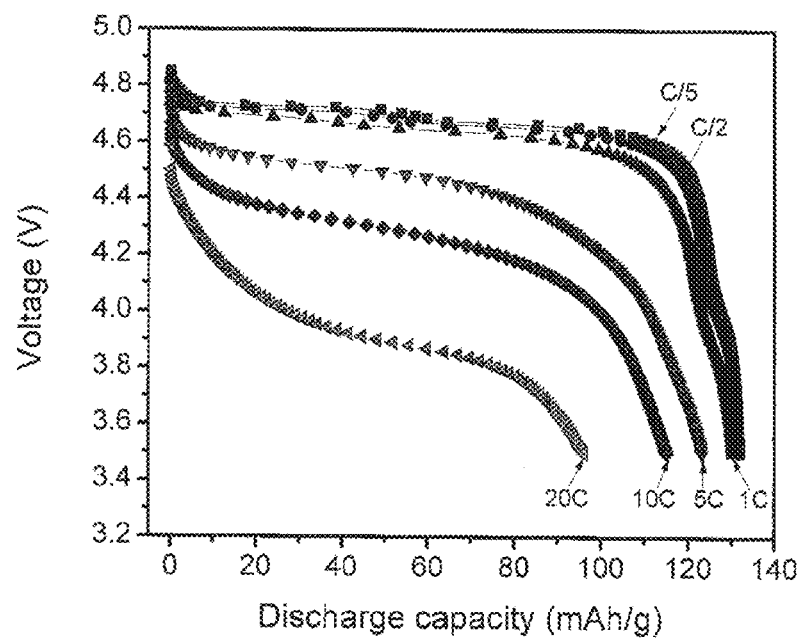
FIG. 15a shows the rate capability of the $0.03Li_2MnO_3\cdot0.97LiMn_{1.5}Ni_{0.45}Fe_{0.05}O_4$ composite material when tested as a cathode material at various discharge current densities.
Figure 15B:
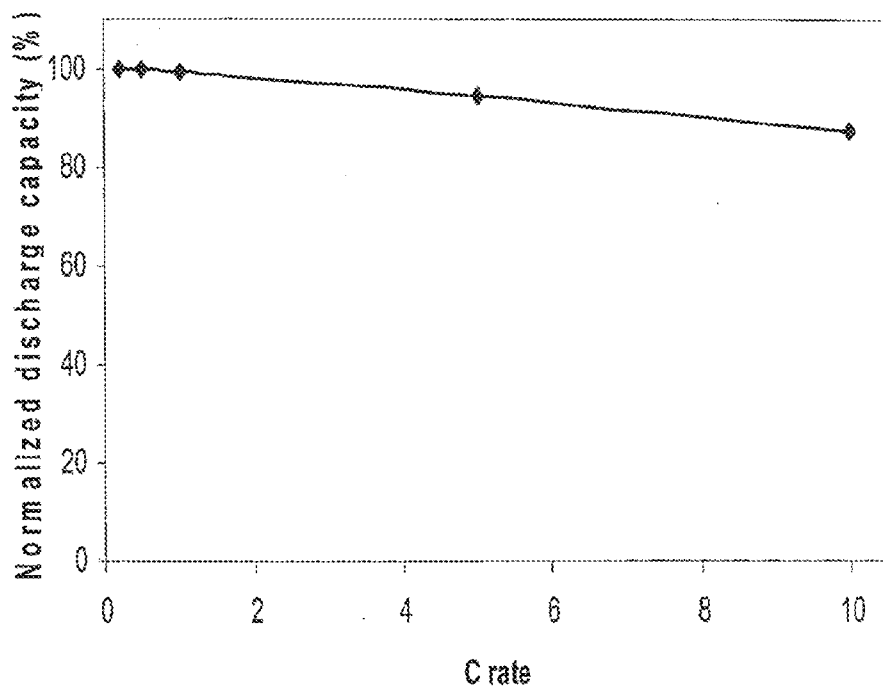
FIG. 15b is a graph of the discharge capacities at different C rates of the $0.03Li_2MnO_3\cdot0.97LiMn_{1.5}Ni_{0.45}Fe_{0.05}O_4$ composite material when tested as a cathode material.

The rate capability of the $0.03Li_2MnO_3 \cdot 0.97LiMn_{1.5}Ni_{0.45}Fe_{0.05}O_4$ composite was tested at various discharge current densities, and the discharge curves are shown in FIG. 15a. The discharge capacities at different C rates were normalized to the discharge capacity at 30 mAh/g and plotted against C rate (see FIG. 15b). Even when discharged at 10° C., the composite can deliver ~87% normalized capacity, indicating a better rate capability than $0.03Li_2MnO_3 \cdot 0.97LiMn_{1.5}Ni_{0.5}O_4$ (~80%.

Example 21 (Comparative)

Figure 16:
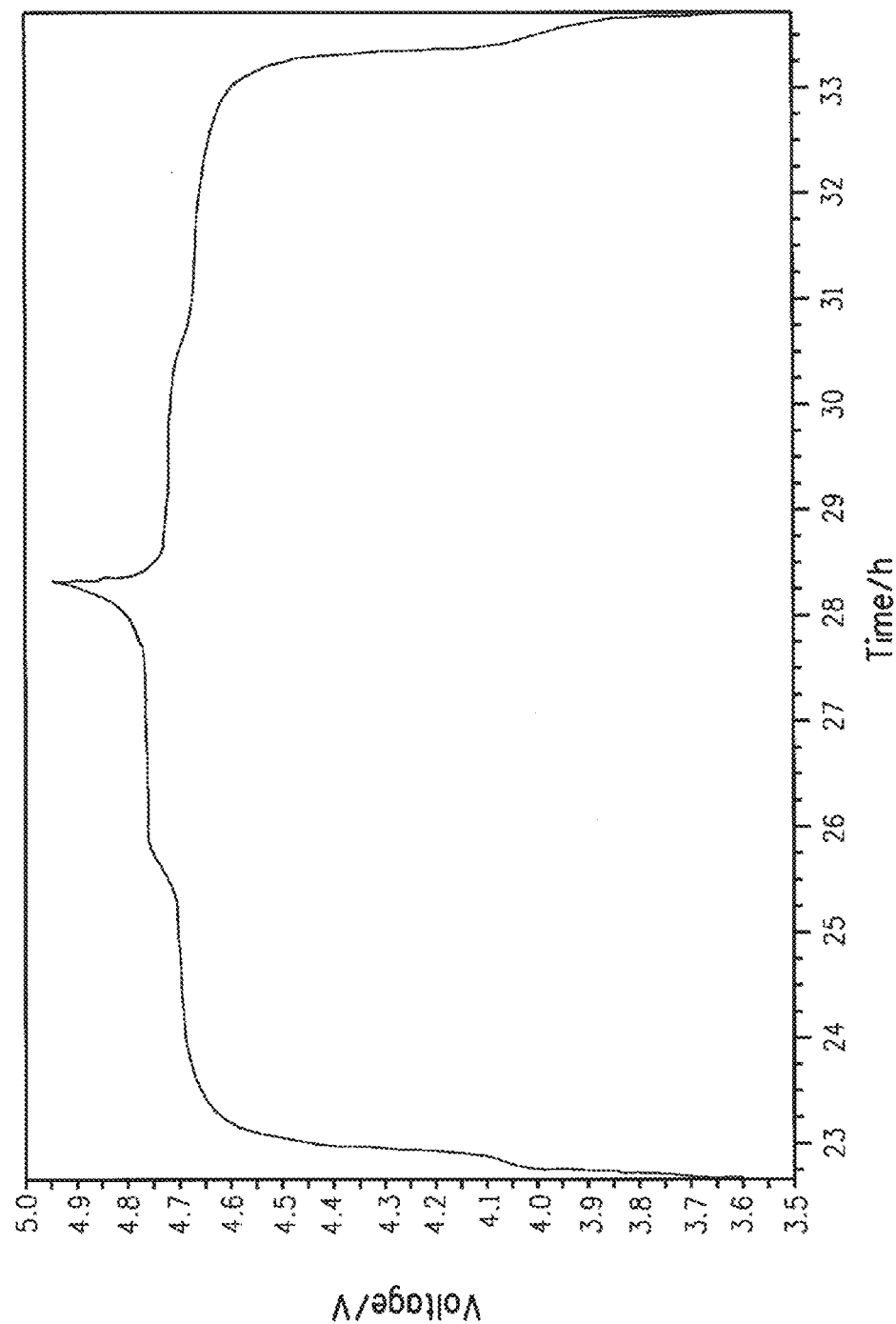
FIG. 16 is a graph of typical charge and discharge curves for $LiMn_{1.5}Ni_{0.5}Fe_{0.05}O_4$.

Typical Charge and Discharge Curves for $LiMn_{1.5}Ni_{0.5}Fe_{0.05}O_4$ $LiMn_{1.5}Ni_{0.5}Fe_{0.05}O_4$ was synthesized by using a method similar to that of Example 5. A $LiMn_{1.5}Ni_{0.5}Fe_{0.05}O_4$/Li half cell was prepared as described above using a electrolyte containing ethyl carbonate (EC)/ethyl methyl carbonate (EMC) in a volume ratio of 30:70 and 1M $LiPF_6$ (Novolyte, Cleveland, Ohio). This half-cell was cycled between 3.5 and 4.95 V at 30 mA/g and 25° C. Typical charge and discharge curves for this composition are shown in shown in FIG. 16. The typical discharge capacity is 136 mAh/g.

Example 22

Delithiation Calculations

The columns of Table 1 below indicate
A Cathode composition
B Example
C Mole Fraction Spinel
D Cathode Experimental 1st Charge capacity mAh/g
E Cathode Experimental 1st Discharge capacity mAh/g
F Formula Weight spinel component g/mol
G Formula Weight layered component g/mol
H Wt fraction of spinel component
I Contribution to 1st Charge capacity from spinel mAh/g
J Contribution to 1st Charge from Layered component, mAh/g
K Contribution to 1st Discharge capacity from spinel mAh/g
L Contribution to 1st Discharge capacity from Layered mAh/g

TABLE 1

| A | B | C mol % | D mAh/g | E mAh/g | F g/mol | G g/mol | H wt % | I mAh/g | J mAh/g | K mAh/g | L mAh/g |
|---|---|---|---|---|---|---|---|---|---|---|---|
| $LiMn_{1.5}Ni_{0.5}O_4 + Li_xNi_{1-x}O$ | 4 | | 152 | 128 | 182.7 | — | 97% | 152 | — | 128 | — |
| $0.03Li_2MnO_3 \cdot 0.97LiMn_{1.5}Ni_{0.5}O_4$ | 2 | 97% | 140 | 130 | 182.7 | 116.8 | 98.1% | 154 | −14 | 129 | 1 |
| $0.1Li_2MnO_3 \cdot 0.9LiMn_{1.5}Ni_{0.5}O_4$ | 6 | 90% | 123 | 101 | 182.7 | 116.8 | 93.4% | 146 | −23 | 123 | −22 |
| $0.5Li_2MnO_3 \cdot 0.5LiMn_{1.5}Ni_{0.5}O_4$ | 8 | 50% | 87 | 70 | 182.7 | 116.8 | 61.0% | 96 | −9 | 80 | −10 |
| $LiMn_{1.5}Ni_{0.5}Fe_{0.05}O_4$ | 16 | 100% | 150 | 136 | 185.5 | — | 100.0% | 150 | — | 136 | — |
| $0.03"Li_2MnO_3" \cdot 0.97LiMn_{1.5}Ni_{0.5}Fe_{0.05}O_4$ | 13 | 97% | 146 | 132 | 185.5 | 116.8 | 98.1% | 147 | −1 | 133 | −1 |

For Examples 4, 2, 6, 8, Column I was calculated as I=H*152/0.97; For Examples 16 & 13, Col I was calculated as I=H*150. Col J was calculated as J=D-I. Col K was calculated as K=H*128/0.97 for Ex 4, 2, 6, and 8; K=H*136 for Ex 16 and 13. Col L was calculated as L=E-K. For Examples 2, 6, and 13, the charge capacities observed are smaller than that expected from the spinel component alone, indicating that the layered component in these examples is electrochemically inactive in both charge and discharge, as demonstrated by the values in Cols J and L.

In addition to vendors named elsewhere herein, various metals and metal oxide compounds suitable for use herein in the preparation of composite materials (or components thereof) may be made by processes known in the art, and/or are available commercially from suppliers such as Alfa Aesar (Ward Hill, Mass.), City Chemical (West Haven, Conn.), Fisher Scientific (Fairlawn, N.J.), Sigma-Aldrich (St. Louis, Mo.) or Stanford Materials (Aliso Viejo, Calif.).

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

Each of the formulae shown herein describes each and all of the separate, individual composite materials (or components thereof) that can be assembled in that formula by (1) making a selection, from within the prescribed limits for one of the variable radicals, substituents or numerical coefficients, of a single value or range of values for same while all of the other variable radicals, substituents or numerical coefficients are held constant; and (2) performing in turn the same type of selection from within the prescribed limits for each of the other variable radicals, substituents or numerical coefficients with the others being held constant. In addition to a selection of a single value or range of values made within the prescribed limits for one particular variable radical, substituent or numerical coefficient of a formulae herein, a plurality of composites (or components) may be described by simultaneously selecting a single value or range of values from within the prescribed limits for more than one variable radical, substituent or numerical coefficient in the formulae.

When a selection made within the prescribed limits for any of the variable radicals, substituents or numerical coefficients in a formulae herein is (i) a subgroup of only one of the members of the whole group contained within the limits, or (ii) a subgroup containing more than one but less than all of the members of the whole group within the limits, the selected member(s) are selected by omitting those other member(s) of the whole group that are not selected to form the subgroup. The composite(s) [or component(s) thereof] described by such process of selection may in such event also be characterized by a definition of one or more of the variable radicals, substituents or numerical coefficients that refers to the whole group of the prescribed limits for that variable but recites that the member(s) omitted to form the subgroup are absent from the whole group.

In the various formulae shown herein that describe composite materials (or components thereof), prescribed limits are stated for each of the variable radicals, substituents or numerical coefficients set forth in the formulae. The identity of the composite material(s) [or component(s) thereof] described by each such formula may be expressed in terms of any of the possible ranges that may be formed from a combination of any two of the maxima and minima as stated in the formula for any one or more of the variable radicals, substituents or numerical coefficients therein. The composite materials (and components) herein thus include each and all of the formulations in which the value for at least one of the variable radicals, substituents or numerical coefficients is expressed by a combination of a maximum and minimum, as set forth above, together with such a combination of maximum and minimum values for any one or more of the other variable radicals, substituents or numerical coefficients.

In the description herein of performance properties by which the various composite materials hereof can be characterized, numerical limits are set forth for the values applicable to each such property. A particular composite material can in such case be described in terms of any of the possible ranges that may be formed from a combination of any two of the maxima and minima as stated for the limits of values applicable to a selected property.

As stated above, where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, lists of compounds, monomers, oligomers, polymers and/or other chemical materials include derivatives of the members of the list in addition to mixtures of two or more of any of the members and/or any of their respective derivatives.

What is claimed is:

1. A composite material represented by Formula IV:

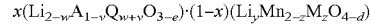

$$x(Li_{2-w}A_{1-v}Q_{w+v}O_{3-e})\cdot(1-x)(Li_yMn_{2-z}M_zO_{4-d}) \qquad IV$$

wherein:
x is in the range of from about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr, or Y;
e is in the range of from 0 to about 0.3;
v is in the range of from 0 to about 0.5;
w is in the range of from 0 to about 0.6;
M comprises one or more of Al, Ca, Co, Cr, Cu, Fe, Ga, Li, Mg, Mn, Nb, Ni, Si, Ti, V, Zn, Zr, or Y;
d is in the range of from 0 to about 0.5;
y is in the range of from 0 to about 1; and
z is in the range of from about 0.3 to about 1; and
wherein:
(i) the $Li_yMn_{2-z}M_zO_{4-d}$ component has a spinel structure and the $Li_{2-w}Q_{w+v}A_{1-v}O_{3-e}$ component has a layered structure; and
(ii) "w+v" is greater than zero.

2. The composition of claim 1, wherein y is in the range of from about 0.5 to about 1; wherein after the composition is fabricated into a cathode for an electrochemical cell, and the cathode is charged to a voltage sufficient to remove $Li^+$ ions from the component of the composite material represented as $(Li_yMn_{2-z}M_zO_{4-d})$ to the extent that y is decreased to a range of in the range of from 0 to about 0.2, and then discharged at a rate of 10 mA/g of composite material to a voltage of about 3.5 V vs. a $Li/Li^+$ reference electrode, the composition participates in discharge of the electrochemical cell such that the contribution to the discharge capacity attributable to the component of the composite material represented as $(Li_{2-w}A_{1-v}Q_{w+v}O_{3-e})$ is less than about 90 mAh/g.

3. The composition of claim 1, wherein x is in the range of from about 0.01 to about 0.06.

4. The composition of claim 1, wherein the $Li_yMn_{2-z}M_zO_{4-d}$ component is cation disordered.

5. The composition of claim 1, wherein Q is one or more of Cr, Co, Cu, Fe, Ga, or Ni.

6. The composition of claim 1, wherein e is in the range of from 0 to about 0.15.

7. The composition of claim 1, wherein w is in the range of from 0 to about 0.3.

8. The composition of claim 1, wherein M is one or more of Cr, Co, Fe, Ga, or Ni.

9. The composition of claim 1, wherein M is $(M'_{y'}M''_{y''})$, wherein:
M' is Ni,
M" is Cr, Co, Fe, or Ga,
y' is from about 0.35 to about 0.5, and
y'+y" equals y.

10. The composition of claim 1 wherein d is in the range of from 0 to about 0.2.

11. The composition of claim 1, wherein z is in the range of from about 0.35 to about 0.6.

12. The composite material of claim 1, wherein Q is one or more of Ca, Cr, Cu, Fe, Ga, Nb, V, Zn, or Y.

13. A lithium ion battery comprising
(a) a housing;
(b) an anode and a cathode disposed in the housing and in ionically conductive contact with one another, wherein the cathode comprises the composite material of claim 1;
(c) a nonaqueous electrolyte composition disposed in the housing and providing an ionically conductive pathway between the anode and the cathode; and
(d) a porous separator between the anode and the cathode.

14. The lithium ion battery of claim 13 wherein the nonaqueous electrolyte composition comprises at least one electrolyte salt and at least one fluorinated ether, fluorinated acyclic carboxylic acid ester, fluorinated acyclic carbonate, or fluorinated cyclic carbonate.

15. A composite material represented by Formula IV:

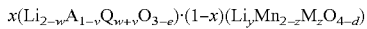

$$x(Li_{2-w}A_{1-v}Q_{w+v}O_{3-e})\cdot(1-x)(Li_yMn_{2-z}M_zO_{4-d}) \qquad IV$$

wherein:
x is in the range of from about 0.005 to less than about 0.1;
A comprises one or more of Mn or Ti;
Q comprises one or more of Al, Ca, Co, Cr, Cu, Fe, Ga, Mg, Nb, Ni, Ti, V, Zn, Zr, or Y, with the caveat that A and Q are not the same;
e is in the range of from 0 to about 0.3;
v is in the range of from 0 to about 0.5;
w is in the range of from 0 to about 0.6;
M comprises one or more of Al, Ca, Co, Cr, Cu, Fe, Ga, Li, Mg, Mn, Nb, Ni, Si, Ti, V, Zn, Zr, or Y;
d is in the range of from 0 to about 0.5;
y is in the range of from 0 to about 1; and
z is in the range of from about 0.3 to about 1; and
wherein:
(i) the $Li_yMn_{2-z}M_zO_{4-d}$ component has a spinel structure and the $Li_{2-w}Q_{w+v}A_{1-v}O_{3-e}$ component has a layered structure; and
(ii) after the composition is fabricated into a cathode for an electrochemical cell, and the cathode is charged to a voltage of about 4.7 to about 4.95 V vs. $Li/Li^+$, the component of the composite material represented as $(Li_{2-w}A_{1-v}Q_{w+v}O_{3-e})$ undergoes delithiation and is thereafter represented as $(Li_{2-w-g}A_{1-v}Q_{w+v}O_{3-e-g/2})$, where g is less than about 0.3; and
(iii) "w+v" is greater than zero.

16. The composite material of claim 15 wherein g is in the range of from 0 to less than about 0.2.

17. The composite material of claim 15 wherein g is in the range of from 0 to about less than 0.2.

* * * * *